US007065709B2

(12) United States Patent
Ellis et al.

(10) Patent No.: US 7,065,709 B2
(45) Date of Patent: Jun. 20, 2006

(54) CLIENT-SERVER ELECTRONIC PROGRAM GUIDE

(75) Inventors: Michael D. Ellis, Boulder, CO (US); Thomas R. Lemmons, Sand Springs, OK (US); William L. Thomas, Bixby, OK (US)

(73) Assignee: United Video Properties, Inc., Hollywood, CA (US)

( * ) Notice: Subject to any disclaimer, the term of this patent is extended or adjusted under 35 U.S.C. 154(b) by 681 days.

(21) Appl. No.: 10/298,274

(22) Filed: May 21, 2002

(65) Prior Publication Data
US 2003/0146940 A1    Aug. 7, 2003

Related U.S. Application Data

(62) Division of application No. 09/374,043, filed on Aug. 13, 1999, now Pat. No. 6,898,762.

(60) Provisional application No. 60/097,538, filed on Aug. 21, 1998.

(51) Int. Cl.
G06F 6/00 (2006.01)
H04N 5/445 (2006.01)
(52) U.S. Cl. .......................... 715/719; 725/53
(58) Field of Classification Search ........ 715/716–722, 715/744, 745; 725/37–61
See application file for complete search history.

(56) References Cited

U.S. PATENT DOCUMENTS

| 4,355,415 A | 10/1982 | George et al. |
| 4,602,279 A | 7/1986 | Freeman |
| 4,605,964 A | 8/1986 | Chard |
| 4,694,490 A | 9/1987 | Harvey et al. |
| 4,718,107 A | 1/1988 | Hayes |
| 4,857,999 A | 8/1989 | Welsh |
| 4,908,707 A | 3/1990 | Kinghorn |
| 4,930,158 A | 5/1990 | Vogel |
| 4,959,720 A | 9/1990 | Duffield et al. |
| 4,977,455 A | 12/1990 | Young |
| 5,109,279 A | 4/1992 | Ando |
| 5,172,413 A | 12/1992 | Bradley et al. |
| 5,200,822 A | 4/1993 | Bronfin et al. |
| 5,253,066 A | 10/1993 | Vogel |

(Continued)

FOREIGN PATENT DOCUMENTS

WO    WO 88/04507    6/1988

(Continued)

OTHER PUBLICATIONS

Hofmann, Neumann, Oberlies, and Schadwinkel, "Videotext Programmier Videorecorder," Rundfunktechnische Mitteilungen, Nov. -Dec. 1982, pp. 254-257.

(Continued)

Primary Examiner—Kristine Kincaid
Assistant Examiner—Lê Nguyen
(74) Attorney, Agent, or Firm—Fish & Neave IP Group of Ropes & Gray, LLP

(57) ABSTRACT

A client-server interactive television program guide system is provided. An interactive television program guide client is implemented on user television equipment. The interactive television program guide provides users with an opportunity to define expressions that are processed by the program guide server. The program guide server may provide program guide data, schedules reminders, schedules program recordings, and parentally locks programs based on the expressions. Users' viewing histories may be tracked. The program guide server may analyze the viewing histories and generates viewing recommendations, targets advertising, and collects program ratings information based on the viewing histories.

24 Claims, 39 Drawing Sheets

U.S. PATENT DOCUMENTS

| | | |
|---|---|---|
| 5,335,277 A | 8/1994 | Harvey et al. |
| 5,412,720 A | 5/1995 | Hoarty |
| 5,422,389 A | 6/1995 | Trepka et al. |
| 5,485,197 A | 1/1996 | Hoarty |
| 5,517,257 A | 5/1996 | Dunn et al. |
| 5,524,195 A | 6/1996 | Clanton, III et al. |
| 5,539,449 A | 7/1996 | Blahut et al. |
| 5,550,576 A | 8/1996 | Klosterman |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,589,892 A | 12/1996 | Knee et al. |
| 5,602,582 A | 2/1997 | Wanderscheid et al. |
| 5,630,119 A | 5/1997 | Aristides et al. |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,666,645 A | 9/1997 | Thomas et al. |
| 5,684,525 A | 11/1997 | Klosterman |
| 5,694,163 A | 12/1997 | Harrison |
| 5,717,452 A | 2/1998 | Janin et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,760,821 A | 6/1998 | Ellis et al. |
| 5,768,528 A | 6/1998 | Stumm |
| 5,778,182 A | 7/1998 | Cathey et al. |
| 5,781,226 A | 7/1998 | Sheehan |
| 5,796,952 A | 8/1998 | Davis et al. |
| 5,802,284 A | 9/1998 | Karlton et al. |
| 5,805,155 A | 9/1998 | Allibhoy et al. |
| 5,805,763 A | 9/1998 | Lawler et al. |
| 5,805,804 A | 9/1998 | Laursen et al. |
| 5,812,123 A | 9/1998 | Rowe et al. |
| 5,818,438 A | 10/1998 | Howe et al. |
| 5,819,019 A | 10/1998 | Nelson |
| 5,828,945 A | 10/1998 | Klosterman |
| 6,005,561 A * | 12/1999 | Hawkins et al. .......... 715/500.1 |
| 6,005,631 A * | 12/1999 | Anderson et al. .............. 725/53 |
| 6,177,931 B1 * | 1/2001 | Alexander et al. ............. 725/52 |
| 6,208,335 B1 | 3/2001 | Gordon et al. |
| 6,721,954 B1 * | 4/2004 | Nickum ....................... 725/46 |
| 2002/0090203 A1 | 7/2002 | Mankovitz ................... 386/83 |

FOREIGN PATENT DOCUMENTS

| | | |
|---|---|---|
| WO | WO 94/14284 | 6/1994 |
| WO | WO 96/34491 | 10/1996 |
| WO | WO 96/41478 | 12/1996 |
| WO | WO 97/13368 | 4/1997 |
| WO | WO 97/46943 | 12/1997 |
| WO | WO 97/47124 | 12/1997 |
| WO | WO 97/48230 | 12/1997 |
| WO | WO 97/49237 | 12/1997 |
| WO | WO 97/17064 | 4/1998 |
| WO | WO 98/43183 | 10/1998 |
| WO | WO 99/03267 | 1/1999 |

OTHER PUBLICATIONS

"Electronic Programme Guide (EPG), Protocol for a TV Guide using electronic data transmission" by European Telecommunication Standards Institute, May 1997, Valbonne, France, publication No. ETS 300 707.

"Windows 98 Feature Combines TV, Terminal and the Internet," New York Times, Aug. 18, 1998.

"Digital Video Broadcasting (DVB); DVB specification for data broadcasting", European Telecommunications Standards Institute, Draft EN 301 192 V1.2.1 (1999-01).

Rewind, replay and unwind with new high-tech TV devices, by Lawrence J. Magid, LA Times. This document was printed from the Internet on Jun. 6, 1999 and bears a date of May 19, 1999.

* cited by examiner

| NARROW SCOPE | MODERATE SCOPE | WIDE SCOPE | TITLE | GENRE | CC | RATING | MANDATORY+ NOT ILLEGAL | HIGHEST LEVEL |
|---|---|---|---|---|---|---|---|---|
| Y | Y | Y | SEINFELD | COMEDY | Y | TV-PG | Y | SL |
| N | N | Y | THE SHINING | HORROR | Y | PG-13 | Y | WD |
| N | N | N | DANTE'S PEAK | COMEDY | Y | R | N | SL |
| N | N | N | NIGHT AT THE OPERA | COMEDY | N | G | N | SL |
| N | Y | Y | ER | DRAMA | Y | TV-PG | Y | NEUTRAL |
| N | N | Y | TERMINATOR | ACTION HORROR | Y | PG-13 | Y | SD |
| N | Y | Y | MY STEPMOTHER IS AN ALIEN | COMEDY HORROR | Y | PG-13 | Y | SL+WD |

FIG. 15

CLIENT-SERVER ELECTRONIC PROGRAM GUIDE

CROSS REFERENCE TO RELATED APPLICATIONS

This applications claims the benefit of U.S. Provisional Application No. 60/097,538, filed Aug. 21, 1998. This application is also a divisional application of U.S. patent application Ser. No. 09/374,043, filed Aug. 13, 1999, now U.S. Pat. No. 6,898,762, which is hereby incorporated by reference herein in its entirety.

BACKGROUND OF THE INVENTION

This invention relates to interactive television program guide systems, and more particularly, to interactive television program guide systems based on client-server arrangements.

Cable, satellite, and broadcast television systems provide viewers with a large number of television channels. Users have traditionally consulted printed television program schedules to determine the programs being broadcast at a particular time. More recently, interactive television program guides have been developed that allow television program information to be displayed on a user's television. Interactive television program which are typically implemented on set-top boxes, allow users to navigate through television program listings using a remote control. In a typical program guide, various groups of television program listings are displayed in predefined or user-selected categories. Program listings are typically displayed in a grid or table. On-line program guides have been proposed that require users to navigate the Internet to access program listings.

Client-server based program guides have been proposed in which program listings are stored on a server at a cable system headend. The server provides the program listings to program guide clients implemented on the set-top boxes of a number of users associated with each headend. As users navigate within a program listings grid, the server provides program listings to the client for display. Such systems, may be limited in their functionality due to their limited use of the resources of the server.

It is therefore an object of the present invention to provide an interactive television program guide system in which server resources are used to provide enhanced program guide features not provided by conventional set-top-box-based or client-server-based program guides.

SUMMARY OF THE INVENTION

This and other objects of the present invention are accomplished in accordance with the principles of the present invention by providing a client-server based interactive television program guide system in which a main facility (e.g., a satellite uplink facility or a facility that feeds such an uplink facility) provides data from one or more data sources to a number of television distribution facilities such as cable system headends, broadcast distribution facilities, satellite television distribution facilities, or other suitable distribution facilities. Some of the data sources may be located at different facilities and have their data provided to the main facility for localization and distribution or may provide their data to the television distribution facilities directly. The data provided to the television distribution facilities includes television programming data (e.g., titles, channels, content information, rating information, program identifiers, series identifiers, or any other information associated with television programming), and other program guide data for additional services other than television program listings (e.g., weather information, associated Internet web links, computer software, etc.). The main facility (and other sources) may provide the program guide data to the television distribution facilities via a satellite link, a telephone network link, a cable or fiber optic link, a microwave link, an Internet link, a combination of such links, or any other suitable communications link.

Each television distribution facility has a program guide server. If desired, program guide servers may also be located at cable system network nodes or other facilities separate from the television distribution facilities or other distribution facilities. Each program guide server stores the program guide data provided by the main facility and provides access to the program guide data to program guide clients implemented on the user television equipment of a number of users associated with each television distribution facility. The program guide servers may also store user data, such as user preference profiles, parental control settings, record and reminder settings, viewing history, and other suitable data.

Providing program guide data with a program guide server and storing user data on the server may provide users with opportunities to perform various functions that may enhance the users' television viewing experience. Users may, for example, set user preference profiles or other favorites that are stored by the program guide server and used by the server to customize the program guide viewing experience for the user. The program guide server may filter program guide data based on the user preference profiles. Only data that is of interest to the user may then be provided to the guide client, thereby tending to minimize the memory requirements of the user's television equipment and lessen the bandwidth requirements of the local distribution network.

A client-server based architecture may also provide users with the ability to search and sort through program related information in ways that might not otherwise be possible due to the limited processing and storage capabilities of the users' television equipment. If desired, users may be provided with access to program guide data without requiring them to navigate the Internet. Users may, for example, define sophisticated boolean or natural language expressions having one or more criteria for searching through and sorting program guide data, scheduling reminders, automatically recording programs and parentally controlling programs. The criteria may also be derived by the program guide server or program guide client from user profiles or by monitoring usage of the program guide. The criteria may be stored on the program guide server. Users may be provided with an opportunity to access, modify, or delete the expressions.

The program guide server may also track the users' viewing histories to provide a user-customized program guide experience. Programs or series of episodes users have watched may be identified and used by the program guide, for example, to inform users when there are showings in the series that the users have not watched. The program guide may, for example, provide viewing recommendations based on a user's viewing history and, if appropriate, on user preference profiles or other criteria stored by the program guide server. The program guide may also target advertisements toward users based on the viewing histories or criteria, and may track the viewing of programs to generate viewership ratings.

Further features of the invention, its nature and various advantages will be more apparent from the accompanying drawings and the following detailed description of the preferred embodiments.

BRIEF DESCRIPTION OF THE DRAWINGS

FIG. 15 shows a table containing an illustrative list of programs that might be available to a user after defining the preference profiles of FIGS. 13a–13f in accordance with the principles of the present invention.

DETAILED DESCRIPTION OF THE PREFERRED EMBODIMENTS

Figure 1:
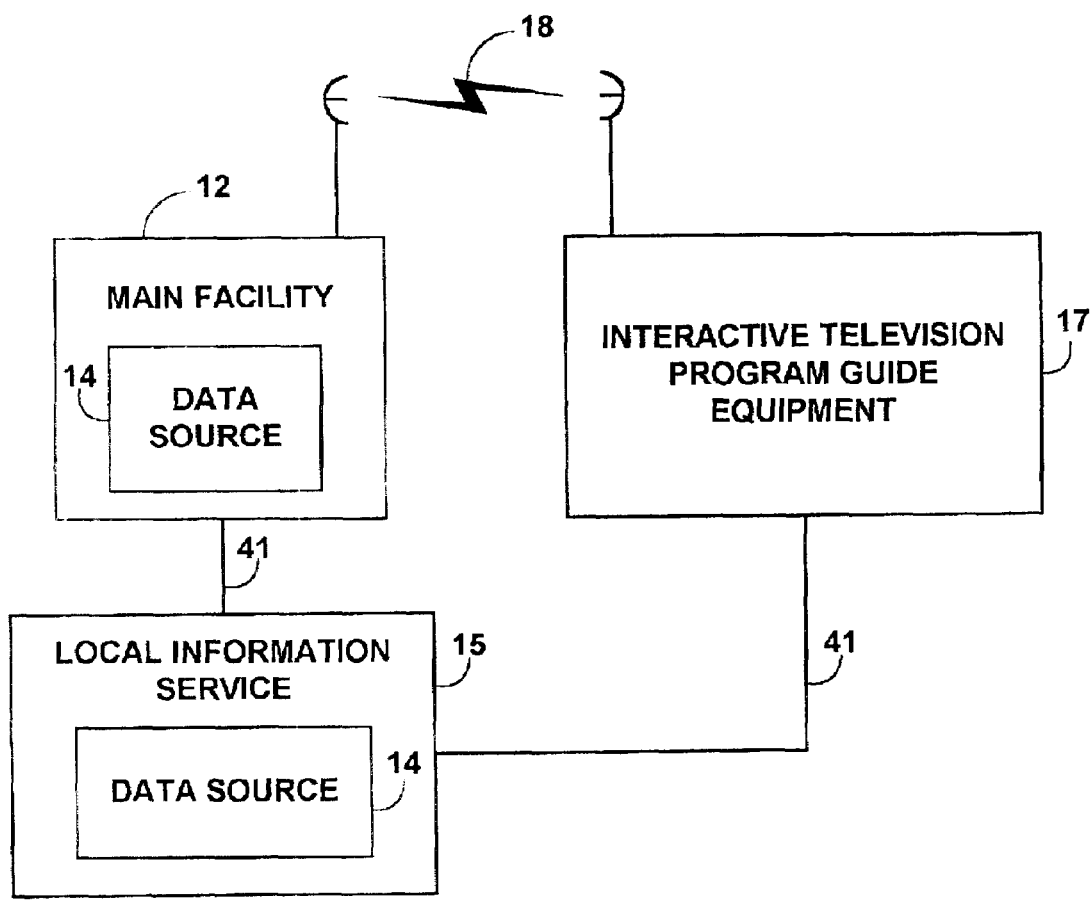
FIG. 1 is a schematic block diagram of an illustrative system in accordance with the present invention.

An illustrative system 10 in accordance with the present invention is shown in FIG. 1. Main facility 12 may provide program guide data from data source 14 to interactive television program guide equipment 17 via communications link 18. There may be multiple program guide data sources in main facility 12 but only one has been shown to avoid over-complicating the drawing. If desired, program guide data sources may be located at facilities separate from main facility 12 such as at local information services 15, and may have their data provided to main facility 12 for localization and distribution. Data sources 14 may be any suitable computer or computer-based system for obtaining data (e.g., manually from an operator, electronically via a computer network or other connection, or via storage media) and placing the data into electronic form for distribution by main facility 12. Link 18 may be a satellite link, a telephone network link, a cable or fiber optic link, a microwave link, an Internet link, a combination of such links, or any other suitable communications link. Video signals may also be transmitted over link 18 if desired.

Local information service 15 may be any suitable facility for obtaining data particular to a localized region and providing the data to main facility 12 or interactive television program guide equipment 17 over communications links 41. Local information service 15 may be, for example, a local weather station that measures weather data, a local newspaper that obtains local high school and college sporting information, or any other suitable provider of information. Local information service 15 may be a local business with a computer for providing main facility 12 with, for example, local ski reports, fishing conditions, menus, etc., or any other suitable provider of information. Link 41 may be a satellite link, a telephone network link, a cable or fiber optic link, a microwave link, an Internet link, a combination of such links, or any other suitable communications link. Additional data sources 14 may be located at other facilities for providing main facility 12 with non-localized data (e.g., non-localized program guide data) over link 41.

The program guide data transmitted by main facility 12 to interactive television program guide equipment 17 may include television programming data (e.g., program identifiers, times, channels, titles, descriptions, series identifiers, etc.) and other data for services other than television program listings (e.g., help text, pay-per-view information, weather information, sports information, music channel information, associated Internet web links, associated software, etc.). There are preferably numerous pieces or installations of interactive television program guide equipment 17, although only one is shown in FIG. 1 to avoid over-complicating the drawing.

Program guide data may be transmitted by main facility 12 to interactive television program guide equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility to television distribution facilities are described, for example, in Gollahon et al. U.S. patent application Ser. No. 09/332,624, filed Jun. 11, 1999, which is hereby incorporated by reference herein in its entirety.

Figure 2A:
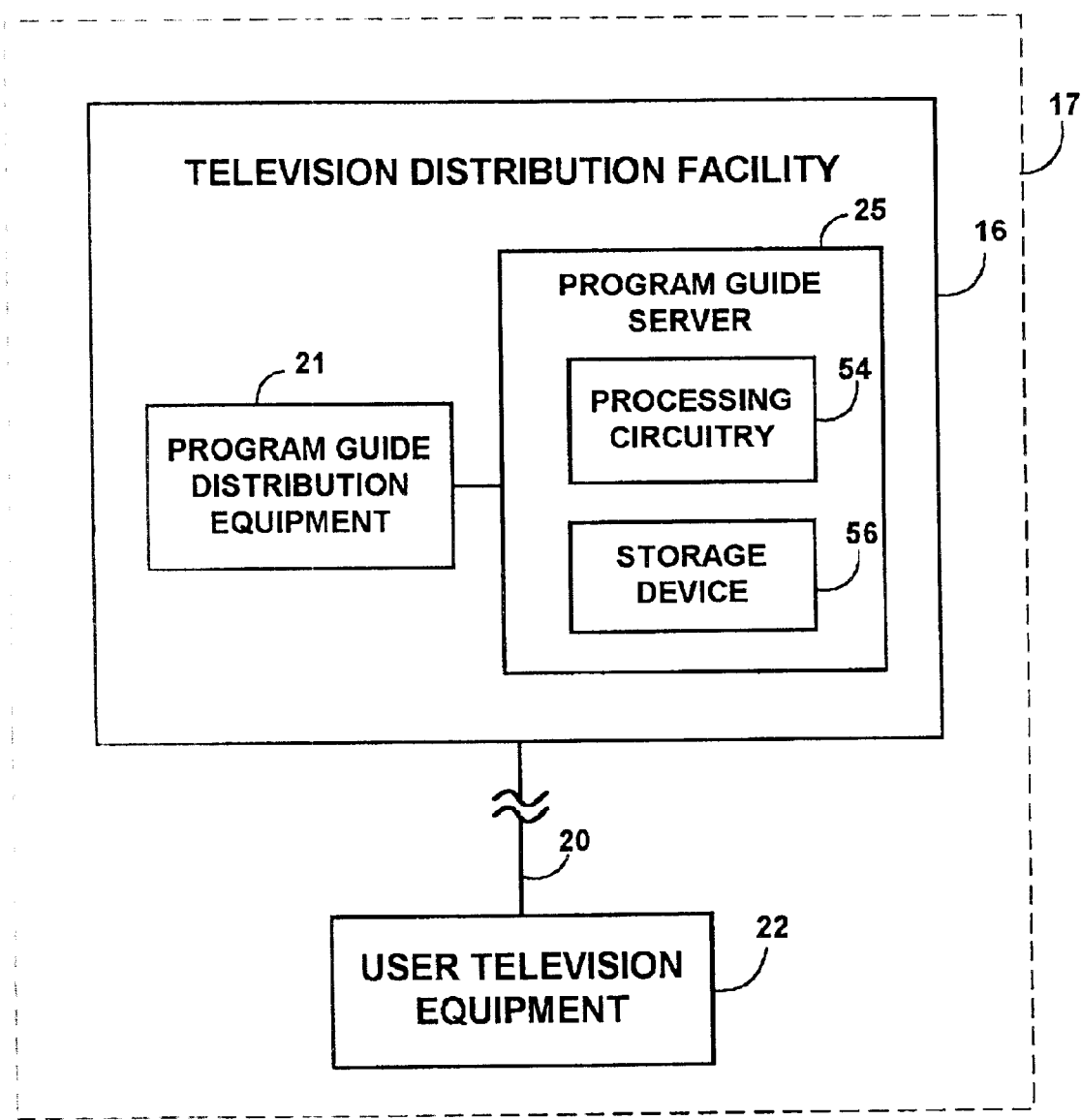
FIGS. 2a, 2b, and 2c show illustrative arrangements for the interactive program guide equipment of FIG. 1 in accordance with the principles of the present invention.
Figure 2B:
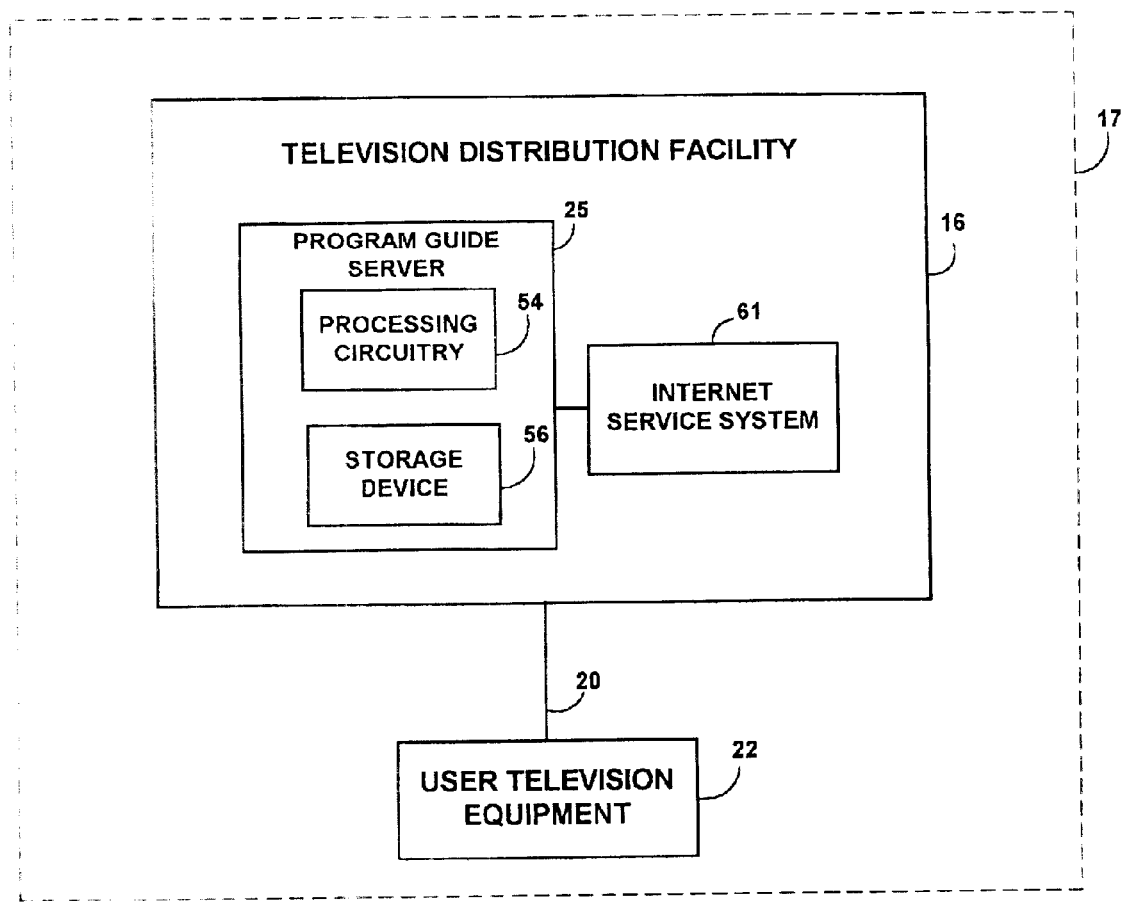
Figure 2C:
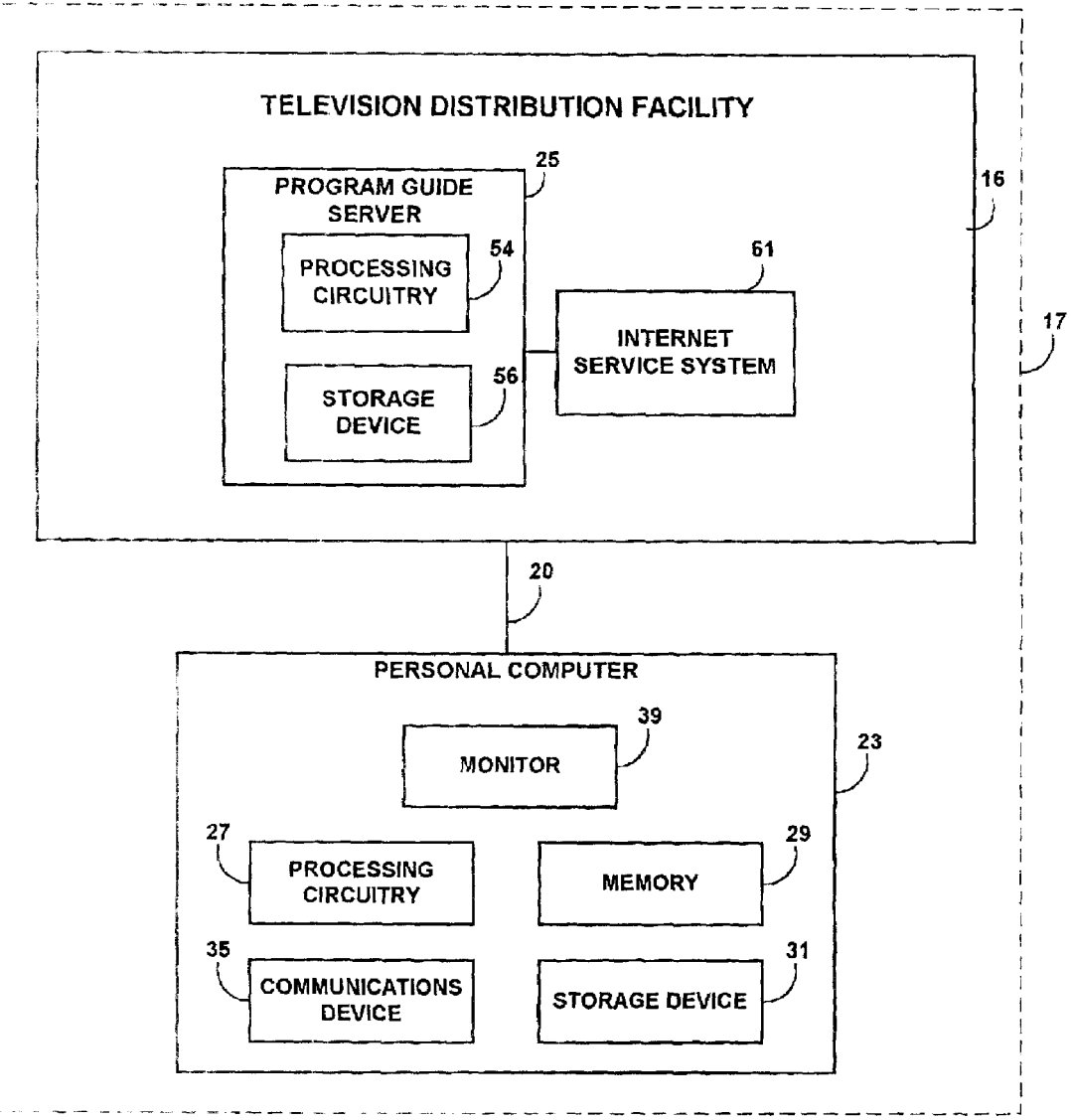

A client-server based interactive television program guide is implemented on interactive television program guide equipment 17. Three illustrative arrangements for interactive television program guide equipment 17 are shown in FIGS. 2a–2c. FIG. 2a shows an illustrative arrangement for interactive television program guide equipment 17 in which a program guide server obtains program guide data directly from main facility 12. FIG. 2b shows an illustrative arrangement for interactive television program guide equipment 17 in which a program guide server obtains program guide data from main facility 12 or some other facility (e.g., local information service 15) via the Internet. In either of these approaches, users may be provided with opportunities to access program guide data without having to navigate the Internet, if desired. As shown in FIGS. 2a and 2b, interactive program guide television equipment 17 may include television distribution facility 16 and user television equipment 22.

Television distribution facility 16 may have program guide distribution equipment 21 and program guide server 25. Distribution equipment 21 is equipment suitable for providing program guide data from program guide server 25 to user television equipment 22 over communications path 20. Distribution equipment 21 may include, for example, suitable transmission hardware for distributing program guide data on a television channel sideband, in the vertical blanking interval of a television channel, using an in-band digital signal, using an out-of-band digital signal, over a dedicated computer network or Internet link, or by any other data transmission technique suitable for the type of communications path 20. Analog or digital video signals (e.g., television programs) may also be distributed by distribution equipment 21 to user television equipment 22 over communications paths 20 on multiple analog or digital television channels. Alternatively, videos may be distributed to user television equipment 22 from some other suitable distribution facility, such as a cable system headend, a broadcast distribution facility, a satellite television distribution facility, or any other suitable type of television distribution facility.

Communications paths 20 may be any communications paths suitable for distributing program guide data. Communications paths 20 may include, for example, a satellite link, a telephone network link, a cable or fiber optic link, a microwave link, an Internet link, a data-over-cable service interface specification (DOCSIS) link, a combination of such links, or any other suitable communications link. Communications paths 20 preferably have sufficient bandwidth to allow television distribution facility 16 or another distribution facility to distribute television programming to user television equipment 22. There are typically multiple pieces of user television equipment 22 and multiple associated communications paths 20, although only one piece of user television equipment 22 and communications path 20 are shown in FIGS. 2a and 2b to avoid over-complicating the drawings. If desired, television programming and program guide data may be provided over separate communications paths.

Program guide server 25 may be based on any suitable combination of server software and hardware. Program guide server 25 may retrieve program guide data or video files from storage device 56 in response to program guide data or video requests generated by an interactive television program guide client implemented on user television equipment 22. As shown in FIGS. 2a and 2b, program guide server 25 may include processing circuitry 54 and storage device 56. Processing circuitry 54 may include any suitable processor, such as a microprocessor or group of microprocessors, and other processing circuitry such as caching circuitry, video decoding circuitry, direct memory access (DMA) circuitry, input/output (I/O) circuitry, etc.

Storage device 56 may be a memory or other storage device, such as random access memory (RAM), flash memory, a hard disk drive, etc., that is suitable for storing the program guide data transmitted to television distribution facility 16 by main facility 12. User data, such as user preference profiles, preferences, parental control settings, record and reminder settings, viewing histories, and other suitable data may also be stored on storage device 56 by program guide server 25. Program guide data and user data may be stored on storage device 56 in any suitable format (e.g., a Structured Query Language (SQL) database). If desired, storage 56 may also store video files for playing back on demand.

Processing circuitry 54 may process requests for program guide data by searching the program guide data stored on storage device 56 for the requested data, retrieving the data, and providing the retrieved data to distribution equipment 21 for distribution to user television equipment 22. Processing circuitry 54 may also process storage requests generated by the program guide client that direct program guide server 25 to store user data. Alternatively, program guide server 25 may distribute program guide data to and receive user data from user television equipment 22 directly. If communications paths 20 include an Internet link, DOCSIS link, or other high speed computer network link (e.g., 10BaseT, 100BaseT, 10BaseF, T1, T3, etc.), for example, processing circuitry 54 may include circuitry suitable for transmitting program guide and user data and receiving program guide data and storage requests over such a link.

Program guide server 25 may communicate with user television equipment 22 using any suitable communications protocol. For example, program guide server 25 may use a communications protocol stack that includes transmission control protocol (TCP) and Internet protocol (IP) layers, sequenced packet exchange (SPX) and internetwork packet exchange (IPX) layers, Appletalk transaction protocol (ATP) and datagram delivery protocol (DDP) layers, DOCSIS, or any other suitable protocol or combination of protocols. User television equipment 22 may also include suitable hardware for communicating with program guide server 25 over communications paths 20 (e.g., Ethernet cards, modems (digital, analog, or cable), etc.)

The program guide client on user television equipment 22 may retrieve program guide data from and store user data on program guide server 25 using any suitable client-server based approach. The program guide may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach. As used herein, "record requests" and "storage requests" are intended to encompass any of these types of inter-process or inter-object communications, or any other suitable type of inter-process or inter-object communication.

FIG. 2*b* shows an illustrative arrangement for interactive television program guide equipment 17 in which program guide server 25 obtains program guide data via the Internet. The program guide data obtained by program guide server 25 may be provided by main facility 12 or from some other source (e.g., local information service 15) and made available on the Internet. Internet service system 61 may use any suitable combination of hardware and software capable of providing program guide data from the Internet to program guide server 25 using an Internet based approach (e.g., using the HyperText Transfer Protocol (HTTP), File Transfer Protocol (FTP), etc.). FIG. 2*b* shows Internet service system 61 as being encompassed by television distribution facility 16. If desired, Internet service system 61 may be located at a facility that is separate from television distribution facility 16. Internet service system 61 may, for example, be located at main facility 12 or at some other Internet node suitable for providing program guide data from the Internet to program guide server 25. The functionality of Internet service system 61 and program guide server 25 may be integrated into one system if desired.

Another suitable arrangement for interactive television program guide equipment 17 is shown in FIG. 2*c*. Interactive television program guide equipment 17 may include, for example, television distribution facility 16 having program guide server 25 and Internet service system 61. A program guide client application may run on personal computer 23. The client may access program guide server 25 via Internet service system 61 and communications path 20. Personal computer 23 may include processing circuitry 27, memory 29, storage device 31, communications device 35, and monitor 39.

Processing circuitry 27 may include any suitable processor, such as a microprocessor or group of microprocessors, and other processing circuitry such as caching circuitry, direct memory access (DMA) circuitry, input/output (I/O) circuitry, etc. Processing circuitry 27 may also include suitable circuitry for displaying television programming. Personal computer 23 may include, for example, a PC/TV card. Memory 29 may be any suitable memory, such as random access memory (RAM) or read only memory (ROM), that is suitable for storing the computer instructions and data. Storage device 31 may be any suitable storage device, such as a hard disk, floppy disk drive, flash RAM card, recordable CD-ROM drive, or any other suitable storage device. Communications device 35 may be any suitable communications device, such as a conventional analog modem or cable modem.

Figure 3:
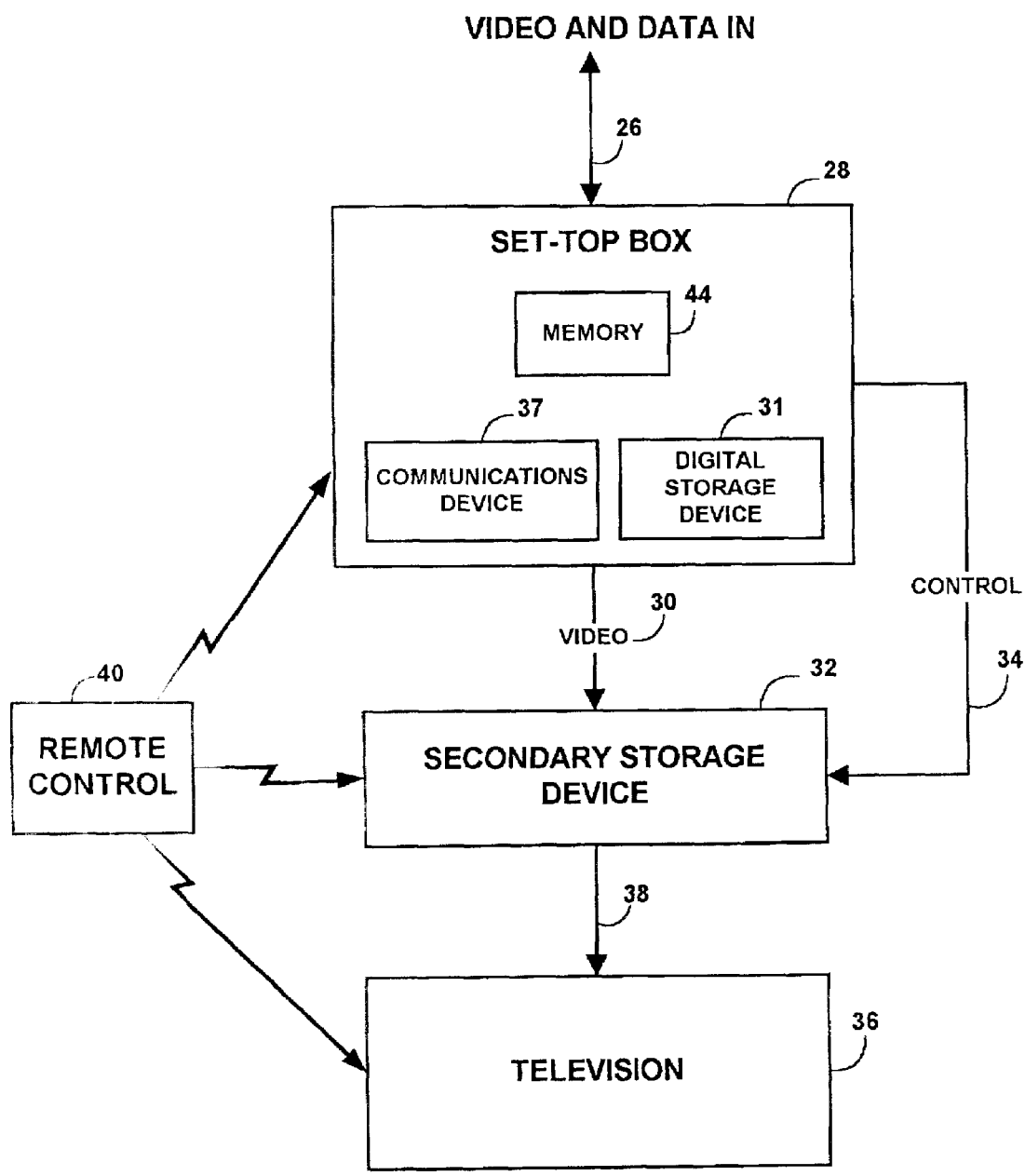
FIG. 3 is an illustrative schematic block diagram of a user television equipment of FIGS. 2a and 2b in accordance with the principles of the present invention.

An illustrative arrangement for user television equipment 22 of FIGS. 2*a* and 2*b* is shown in FIG. 3. User television equipment 22 of FIG. 3 receives analog video or a digital video stream and data, program guide data, or any suitable combination thereof, from television distribution facility 16 (FIG. 1) at input 26. During normal television viewing, a user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide client may run on set-top box 28, on television 36 (if television 36 has suitable processing circuitry and memory), on a suitable analog or digital receiver connected to television 36, or on digital storage device 31 if digital storage device 31 has suitable processing circuitry and memory. The interactive television program guide client may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

If desired, a user may record programs, program guide data, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. Digital storage device 31 may, for example, be contained in local media server 29. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which a user has tuned with set-top box 28. Video signals may also be provided to television 36 by set-top box 28 when set-top box 28 is used to play back information stored on digital storage device 31.

Set-top box 28 may have communications device 37 for communicating with program guide server 25 over communications path 20. Communications device 37 may be a modem (e.g., any suitable analog or digital standard, cellular, or cable modem), network interface card (e.g., an Ethernet card, Token ring card, etc.), a combination of such devices, or any other suitable communications device. Television 36 may also have such a suitable communications device if desired.

Set-top box 28 may have memory 44. Memory 44 may be any memory or other storage device, such as a random access memory (RAM), read only memory (ROM), flash memory, a hard disk drive, a combination of such devices, etc., that is suitable for storing program guide client instructions and program guide data for use by the program guide client.

Figure 4:
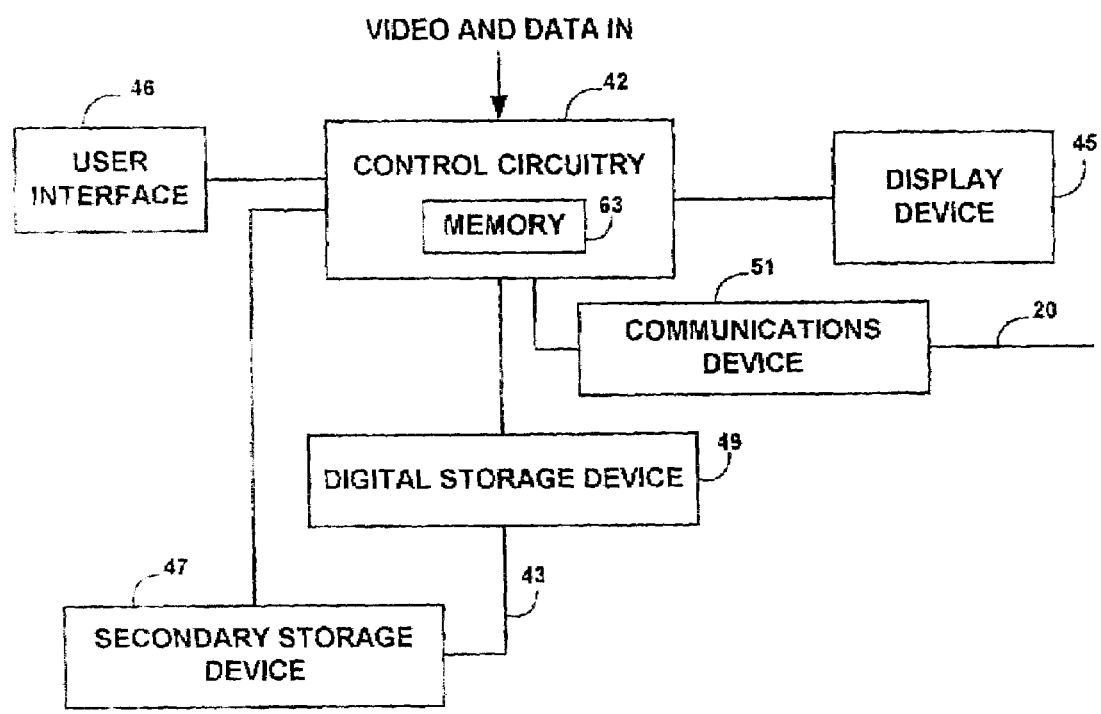
FIG. 4 is a generalized schematic block diagram of portions of the illustrative user television equipment of FIG. 3 in accordance with the principles of the present invention.

A more generalized embodiment of user television equipment 22 of FIG. 3 is shown in FIG. 4. As shown in FIG. 4, program guide data from television distribution facility 16 (FIG. 1) and programming are received by control circuitry 42 of user television equipment 22. The functions of control circuitry 42 may be provided using the set-top box arrangement of FIGS. 2a and 2b. Alternatively, these functions may be integrated into an advanced television receiver, personal computer television (PC/TV) such as shown in FIG. 2c, or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing program guide client instructions and program guide data for use by control circuitry 42.

User television equipment 22 of FIG. 4 may also have communications device 51 for supporting communications between the program guide client and program guide server 25 and via communications path 20. Communications device 51 may be a modem (e.g., any suitable analog or digital standard, cellular, or cable modem), network interface card (e.g., an Ethernet card, Token ring card, etc.), a combination of such devices, or any other suitable communications device.

A user controls the operation of user television equipment 22 with user interface 46. User interface 46 may be a pointing device, wireless remote control, keyboard, touchpad, voice recognition system, or any other suitable user input device. To watch television, a user instructs control circuitry 42 to display a desired television channel on display device 45. To access the functions of the program guide, a user instructs the program guide implemented on interactive television program guide equipment 17 to generate a main menu or other desired program guide display screen for display on display device 45. If desired, the program guide client running on user television equipment 22 may provide users with access to program guide features without requiring them to navigate the Internet.

The program guide may provide users with an opportunity to access program guide features through a main menu. A main menu screen, such as illustrative main menu screen 100 of FIG. 5, may include menu 102 of selectable program guide features 106. If desired, program guide features 106 may be organized according to feature type. In menu 102, for example, program guide features 106 have been organized into three columns. The column labeled "TV GUIDE" is for listings related features, the column labeled "MSO SHOWCASE" is for multiple system operator (MSO) related features, and the column labeled "VIEWER SERVICES" is for viewer related features. The interactive television program guide may generate a display screen for a particular program guide feature when a user selects that feature from menu 102.

Main menu screen 100 may include one or more selectable advertisements 108. Selectable advertisements 108 may, for example, include text and graphics advertising pay-per-view programs or other programs or products. When a user selects a selectable advertisement 108, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The current time may be displayed in clock display region 116. In addition, a suitable indicator such as indicator graphic 118 may be used to indicate to a user that mail from a cable operator is waiting for a user if the program guide supports messaging functions.

The interactive television program guide may provide a user with an opportunity to view television program listings. A user may indicate a desire to view program listings by, for example, positioning highlight region 120 over a desired program guide feature 106. Alternatively, the program guide may present program listings when a user presses a suitable key (e.g., a "guide" key) on remote control 40. When a user indicates a desire to view television program listings, the program guide client requests listings from program guide server 25 and generates an appropriate program listings screen for display on display device 45 (FIG. 4). Program listings screens may be overlaid on a program being viewed by a user or overlaid on a portion of the program in a "browse" mode. Program listings screens are described, for example, in Knudson et al. U.S. patent application Ser. No. 09/357,941, filed Jul. 16, 1999, which is hereby incorporated by reference herein in its entirety.

A program listings screen may contain one or more groups or lists of program listings organized according to one or more organization criteria (e.g., by time, by channel, by program category, etc.). The program guide may, for example, provide a user with an opportunity to view listings by time, by channel, according to a number of categories (e.g., movies, sports, children, etc.), or may allow a user to search for a listing by title. Program listings may be displayed using any suitable list, table, grid, or other suitable display arrangement. If desired, program listings screens may include selectable advertisements, product brand logo graphics, service provider brand graphics, clocks, or any other suitable indicator or graphic.

A user may indicate a desire to view program listings by time, channel, or category by, for example, selecting a selectable feature 106 from menu 102. In response, the program guide client may issue one or more requests to program guide server 25 for listings in the selected category if such listings are not already cached in memory 63 (FIG. 4). Program guide server 25 may retrieve program guide data stored on storage device 56, on another server, or from Internet service system 61, and provide the data to the program guide client via program guide distribution equipment 21.

Figure 6:
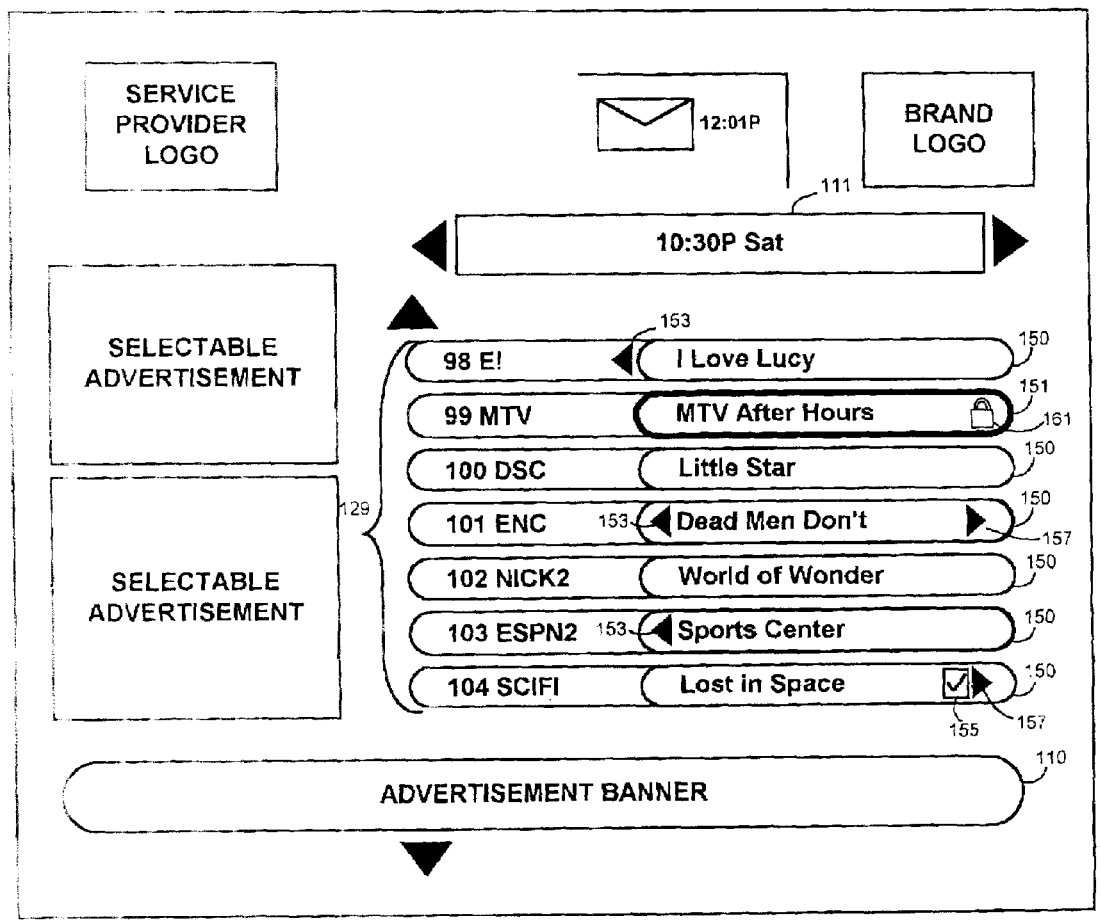
FIG. 6 is an illustrative program listings by time screen in accordance with the principles of the present invention.

The program guide client may display program listings in a suitable program listings screen on user television equipment 22. FIG. 6 illustrates the display of program listings by time. Program listings screen 130 of FIG. 6 may include highlight region 151, which highlights the current program listing 150. A user may position highlight region 151 by entering appropriate commands with user interface 46. For example, if user interface 46 has a keypad, a user can position highlight region 151 using "up" and "down" arrow keys on remote control 40. A user may select a listing by, for example, pressing on the "OK" or "info" key on remote control 40. Alternatively, a touch sensitive screen, trackball, voice recognition device, or other suitable device may be used to move highlight region 151 or to select program listings without the use of highlight region 151. In still another approach, a user may speak a television program listing into a voice request recognition system. These methods of selecting program listings are merely illustrative. Any other suitable approach for selecting program listings may be used if desired.

A user may view additional listings for the time slot indicated in timebar 111 by, for example, pressing an "up" or "down" arrow, or a "page up" or "page down" key on remote control 40. The user may also see listings for the next 24 hour period, or the last 24 hour period, by pressing a "day forward" or "day backward" key on remote control 40, respectively. If there are no listings starting exactly 24 hours in the indicated direction, the program guide may pick programs starting at either closer or further than 24 hours away. If desired, the program guide may require a user to scroll through advertisement banner 110. A user may view program listings for other time slots by, for example, pressing "right" and "left" arrows on remote control 40.

Figure 7:
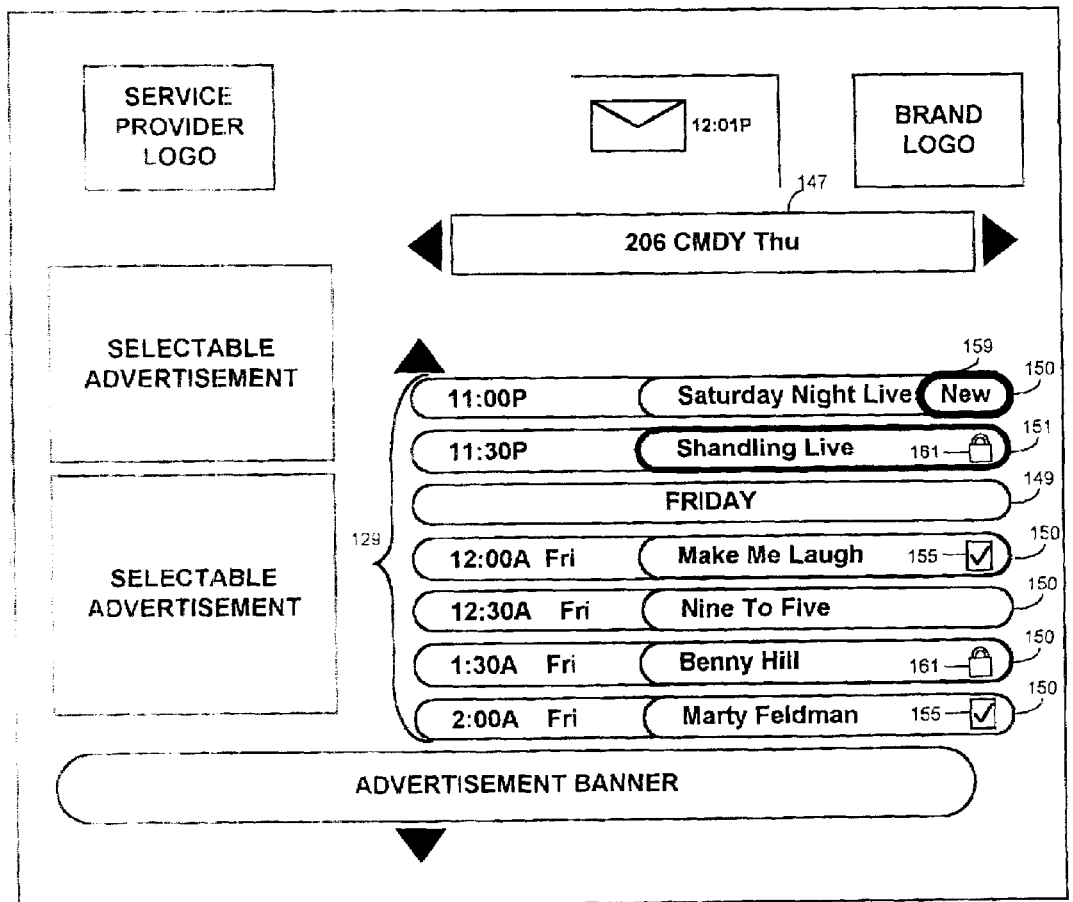
FIG. 7 is an illustrative program listings by channel screen in accordance with the principles of the present invention.

FIG. 7 illustrates the display of program listings by channel. A user may scroll up and down to view program listings for additional time slots, and may scroll left and right to view program listings for other channels. If desired, the day for which program listings are displayed may be included in display area 147 with the channel number as shown.

Figure 8A:
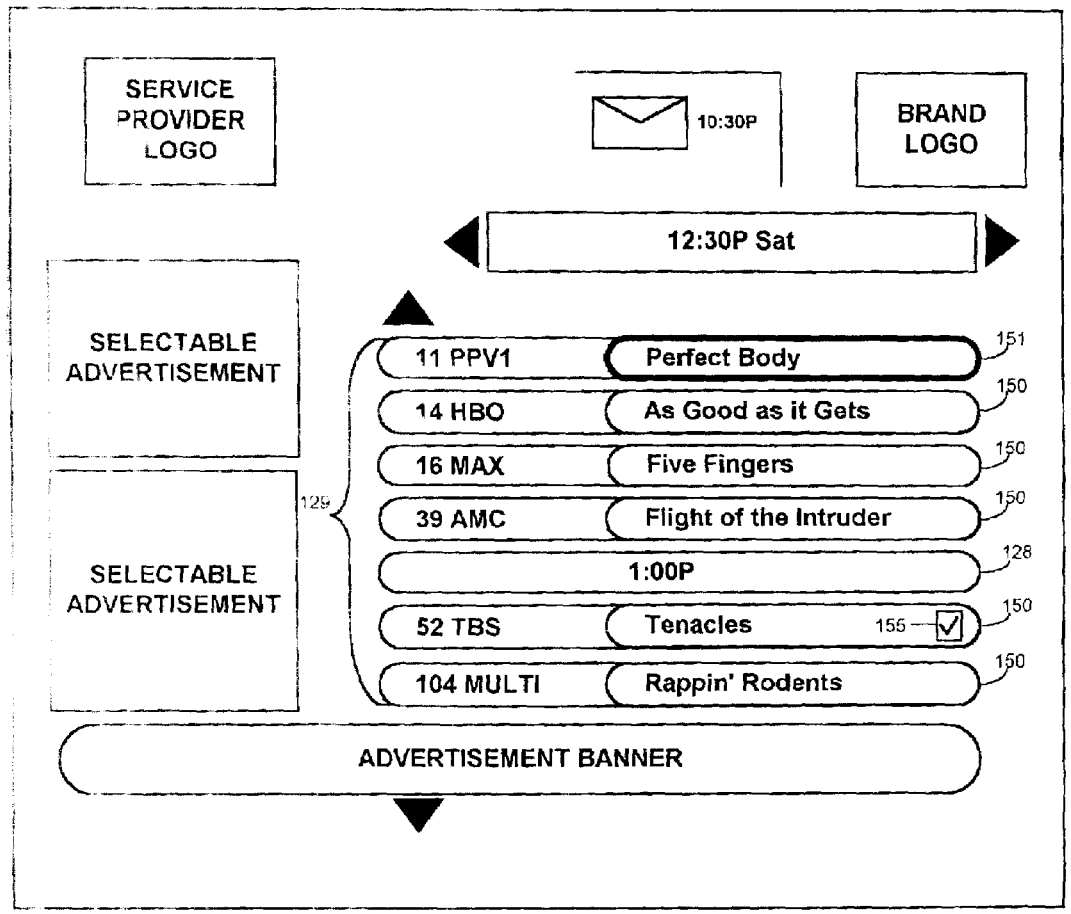
FIGS. 8a–8c are illustrative program listings by category screens in accordance with the principles of the present invention.
Figure 8B:
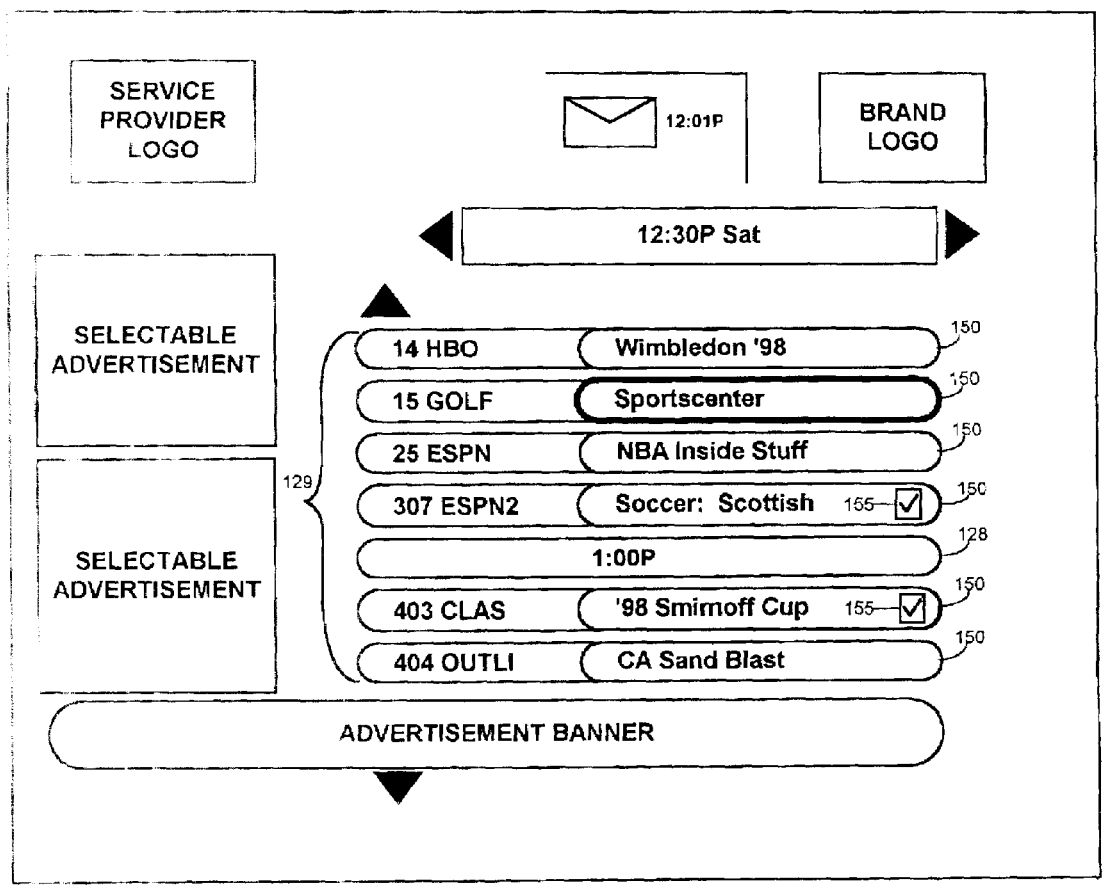
Figure 8C:
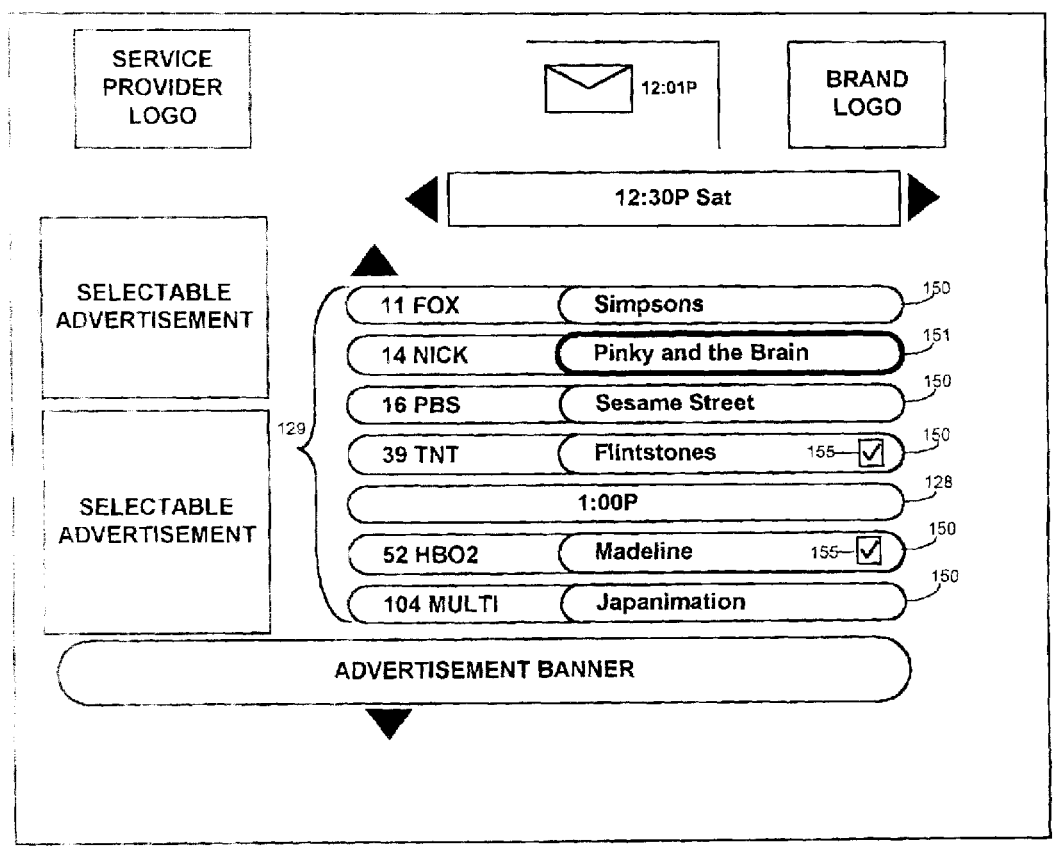

The program guide may provide users with an opportunity to view program listings sorted by category. A user may, for example, press a special category key on remote control 40 (e.g., "movies", "sports", "children", etc.), select a selectable category feature from main menu screen 100 (FIG. 5), or may indicate a desire to view program listings by category using any other suitable approach. FIG. 8*a* is an illustrative program listings screen in which program listings for movies are displayed. FIG. 8*b* is an illustrative program listings screen in which program listings for sports-related programming are displayed. FIG. 8*c* is an illustrative program listings screen in which program listings for children's programs are displayed.

In program listings display screens such as those shown in FIGS. 7*a* and 8*a*–8*c* for example, program listings within lists 129 may be divided into predefined time slots, such as into 30 minute time slots. Between each time slot, separator 128 may be displayed to indicate to a user that a user has scrolled or paged program listings from one time slot to the next. In FIG. 7 for example, a user is scrolling from program listings in the 11:30 PM to the 12:00 AM time slot. This is indicated by the display of the name of the next week day. In FIGS. 8*a*–8*c*, for example, a user is scrolling from program listings in the 12:30 PM time slot to program listings in the 1:00 PM time slot. If desired, separators 128 may be displayed only for those timeslots for which there are listings. When the user scrolls within listings, highlight region 151 may skip separator 128. FIGS. 6, 7, and 8*a*–8*c* also illustrate how the program guide may display an advertisement banner so that a user is required to scroll past the banner to access additional program listings.

The program listings screens of FIGS. 6, 7, 8*a*, 8*b*, and 8*c* have also been shown as including various other screen elements. Program listings display screens may include, for example, selectable advertisements, advertisement banners, brand logos, service provider logos, clocks, message indicators, or any other suitable screen element. The program guide may provide users with access to selectable advertisements in response to, for example, a user pressing left arrows to move highlight region 151 to highlight a selectable advertisement. In the illustrative program listings screens of FIGS. 6, 8*a*, 8*b*, and 8*c*, the program guide may also adjust the time displayed in timebar 123 as the user scrolls or pages through program listings to reflect the time of the program listing at the top of the list.

The program guide client may provide a user with an opportunity to define sophisticated boolean or natural language expressions of one or more criteria. Such criteria may include, for example, attribute type and attribute information that is provided by program guide server 25. The user defined expressions may be stored by program guide server 25 for searching through and sorting program guide data, scheduling reminders, automatically recording programs, and parentally controlling programs. Criteria may also be derived by the program guide server or program guide client from user profiles or by monitoring usage of the program guide or advertising. Program guide server 25 may also use expressions to obtain other types of information or programs. Program guide server 25 may obtain, for example, video-on-demand programs, web site links, games, chat group links, merchandise information, or any other suitable information or programming from data sources 14 located at main facility 12 or other facilities. The program guide client may provide users with an opportunity to access, modify, or delete the expressions if desired.

Figure 5:
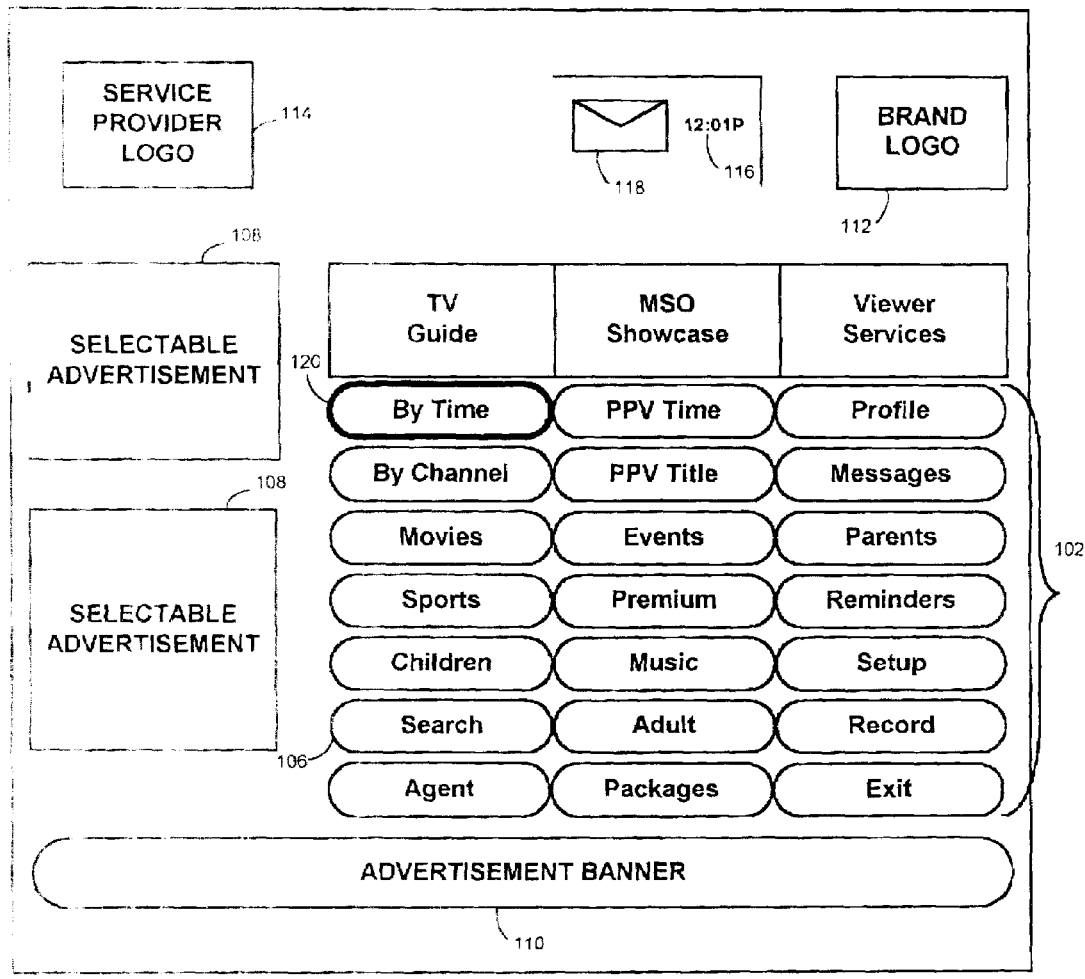
FIG. 5 is an illustrative main menu screen in accordance with the principles of the present invention.

A user may indicate a desire to search program guide data by, for example, selecting selectable Search feature 106 of main menu 102 (FIG. 5). In response, the program guide client may display a criteria screen, such as illustrative criteria screen 141 and 149 of FIGS. 9*a* and 9*b*. The program guide client may display criteria screen 141 of FIG. 9*a* to provide a user with an opportunity to define a boolean expression. The user may construct a boolean expression by selecting criteria such as attribute types, attributes, logical operators, and sorting criteria. User selectable criteria may also include what program guide server 25 searches for such as, for example, program listings, program information, web sites, video-on-demand videos, software, or any other suitable program guide data, other information, or videos.

Figure 9A:
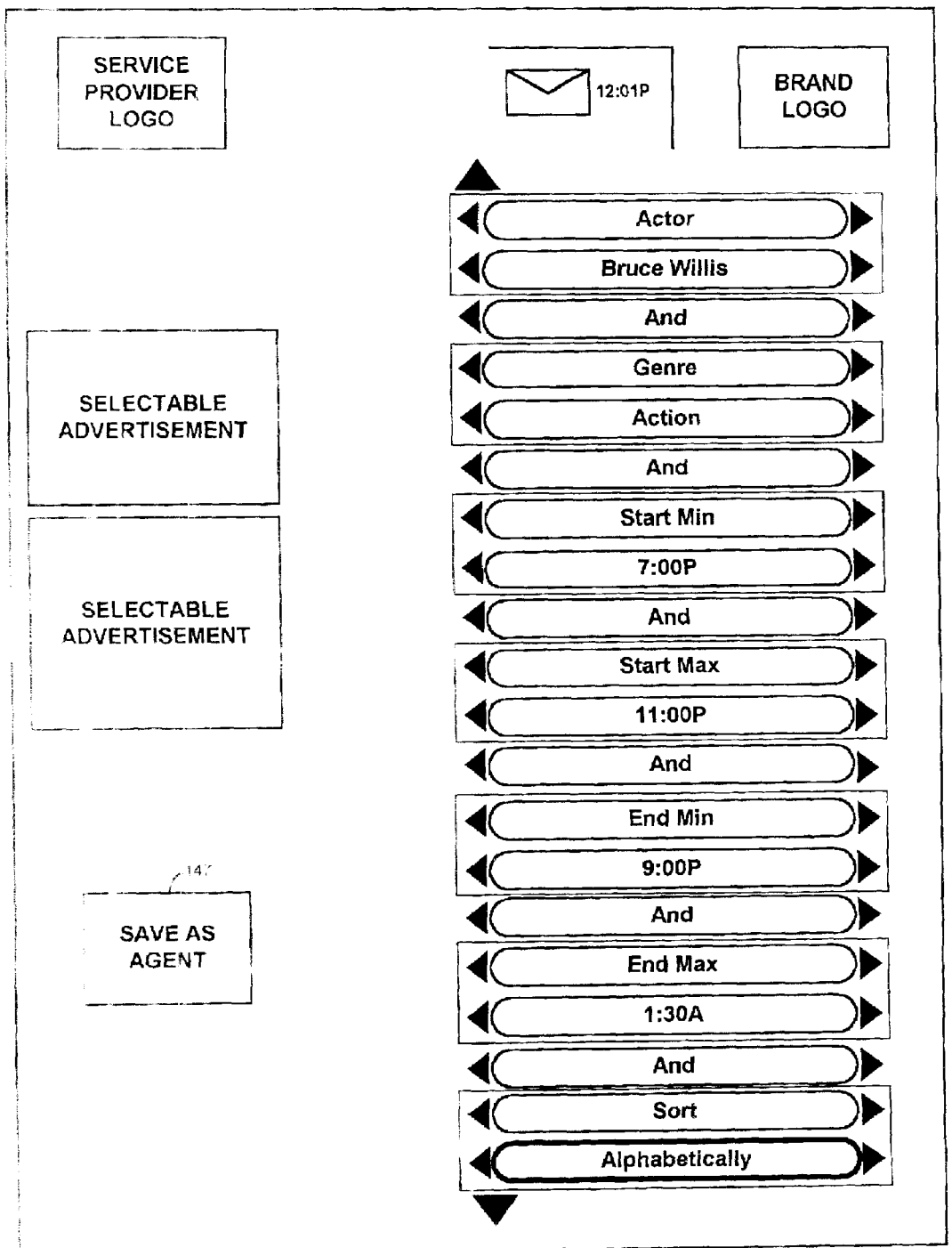
FIG. 9a is an illustrative boolean type criteria screen in accordance with the principles of the present invention.

Users may define expressions by, for example, arrowing up or down between criteria, arrowing left or right to choose an attribute, attribute type or logical operator, and pressing a suitable key to indicate that the user is finished (e.g., an "OK" key). In the example of FIG. 9*a*, the user has constructed a boolean expression for all action programs that have the actor Bruce Willis, that start between 7:00P and 11:00P, and that end between 9:00P and 1:30A on the current day. FIG. 9*a* has not been shown as including criteria for selecting what program guide server 25 searches for to avoid over-complicating the drawing.

Figure 9B:
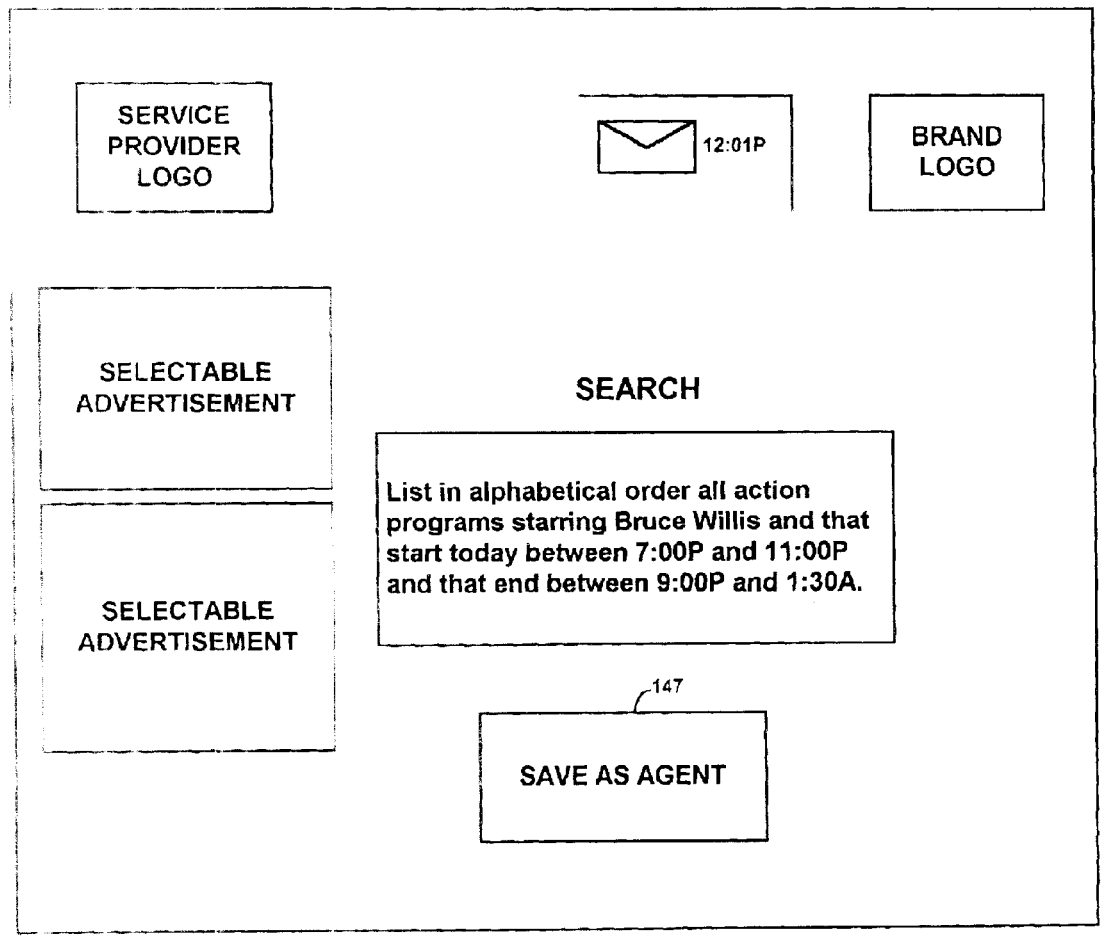
FIG. 9b is an illustrative natural language criteria screen in accordance with the principles of the present invention.

The program guide client may display criteria screen 149 of FIG. 9*b* to provide a user with an opportunity to construct a natural language expression. The user may enter a natural language phrase, such as "List in alphabetical order all action programs starring Bruce Willis and that start today between 7:00P and 11:00P and that end between 9:00P and 1:30A" using user interface 46 (FIG. 4).

Figure 11:
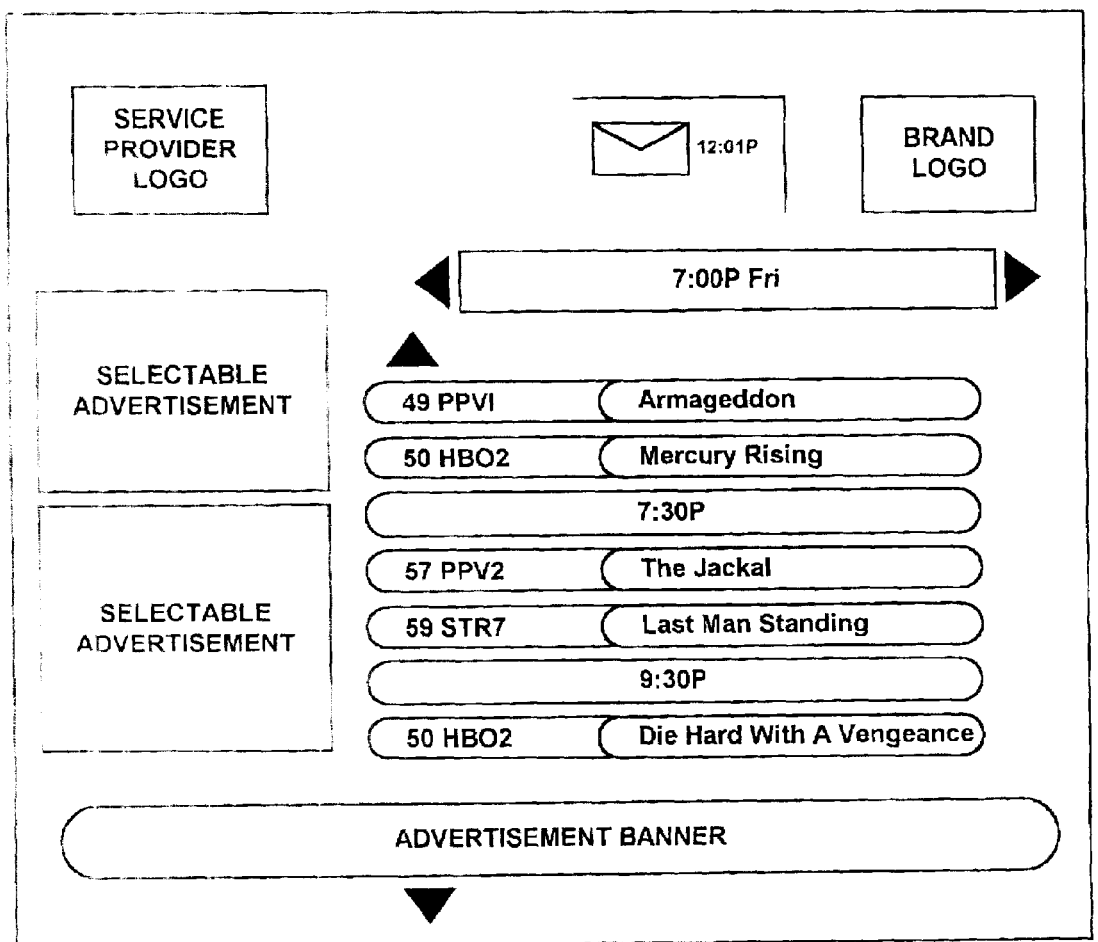
FIG. 11 is an illustrative program listings screen in which program listings found according to the illustrative expressions of FIGS. 9a and 9b are displayed in accordance with the principles of the present invention.

The program guide client may submit the user defined boolean expression or the natural language expression to program guide server 25 for processing. Program guide server 25 may process the expression, and provide the resulting program guide data (e.g., program listings, program information, software, Internet links, etc.) or video programs to the program guide client for display. FIG. 11 shows an illustrative program listings screen that may be displayed by the program guide client in response to the expressions defined in FIGS. 9*a* and 9*b*.

Users may also indicate a desire to have program guide server 25 automatically process expressions by, for example, saving defined expressions as agents. A user may indicate a desire to save an expression as an agent by, for example, selecting Save As Agent selectable feature 147 of FIGS. 9*a* and 9*b* after defining a boolean or natural language expression. The program guide client may automatically highlight Save As Agent selectable feature 147 when a user indicates that the user is finished defining an expression (e.g., by pressing an "OK" key). If desired the program guide client may provide the user with an opportunity to name the agent.

Figure 10:
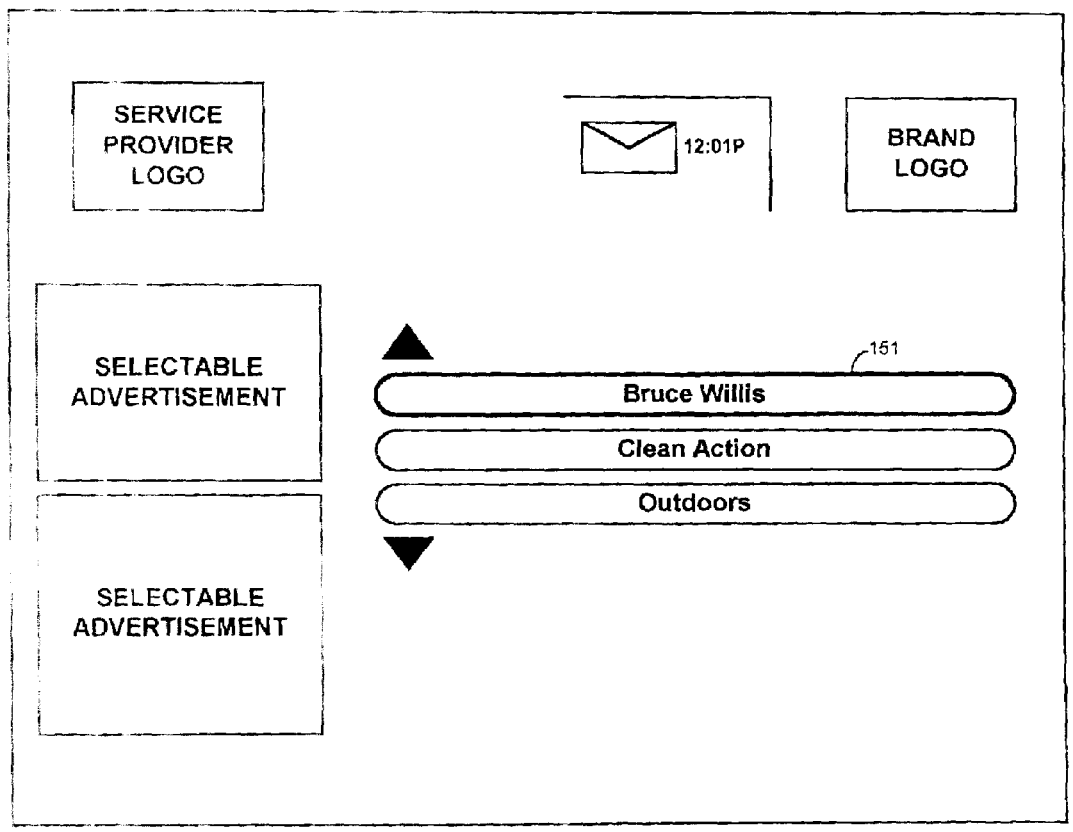
FIG. 10 shows an illustrative agents screen in accordance with the principles of the present invention.

Users may access saved expressions or agents by, for example, selecting selectable Agent feature 106 of main menu 102. In response, the program guide client may display a list of saved expressions or agents. An illustrative agents screen 1101 is shown in FIG. 10. A user may indicate a desire to view program listings by, for example, positioning highlight region 151 over the desired expression and pressing an "OK" key on remote control 40. In response to a user indicating a desire to access an expression, the program guide client may submit the user defined expression to program guide server 25 for processing. Program guide server may process the expression, and provide program listings to the program guide client for display in a program listings screen. For example, if a user saved the boolean expression of FIG. 9*a*, named it "Bruce Willis", and then indicated a desire to access listings for the expression the program guide client may display the listings screen of FIG. 10.

In still another approach, the program guide client may provide the expression to program guide server 25 in response to the user saving the expression as an agent. Program guide server 25 may store the expression and monitor the data stored on storage device 56 for program guide listings, program information, other information, software, videos, etc., that match the expression. Program guide server 25 may also query other sources for program guide data and videos that match the expression via, for example, the Internet. Program guide server 25 may obtain the program guide data, other information or videos from storage device 56 or other sources and provide them to the program guide client when the user indicates a desire to access the agent. Alternatively, program guide server 25 may provide the program guide data, other information, or videos to the program guide client automatically when the user accesses a feature of the program guide that would display such information. In still another suitable approach, program guide server 25 may provide, for example, program identifiers and air times to the program guide client for use in generating program reminders that indicate found programs.

Figure 12:
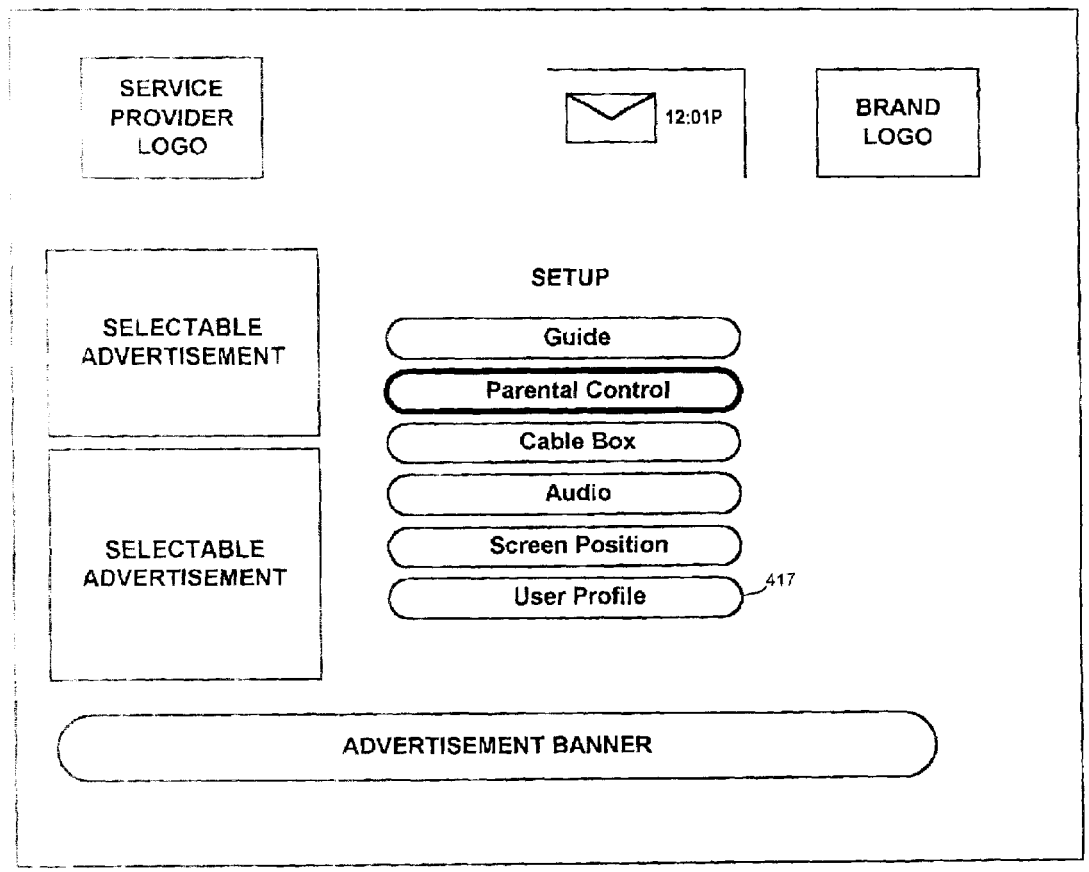
FIG. 12 shows an illustrative setup screen in accordance with the principles of the present invention.
Figure 13A:
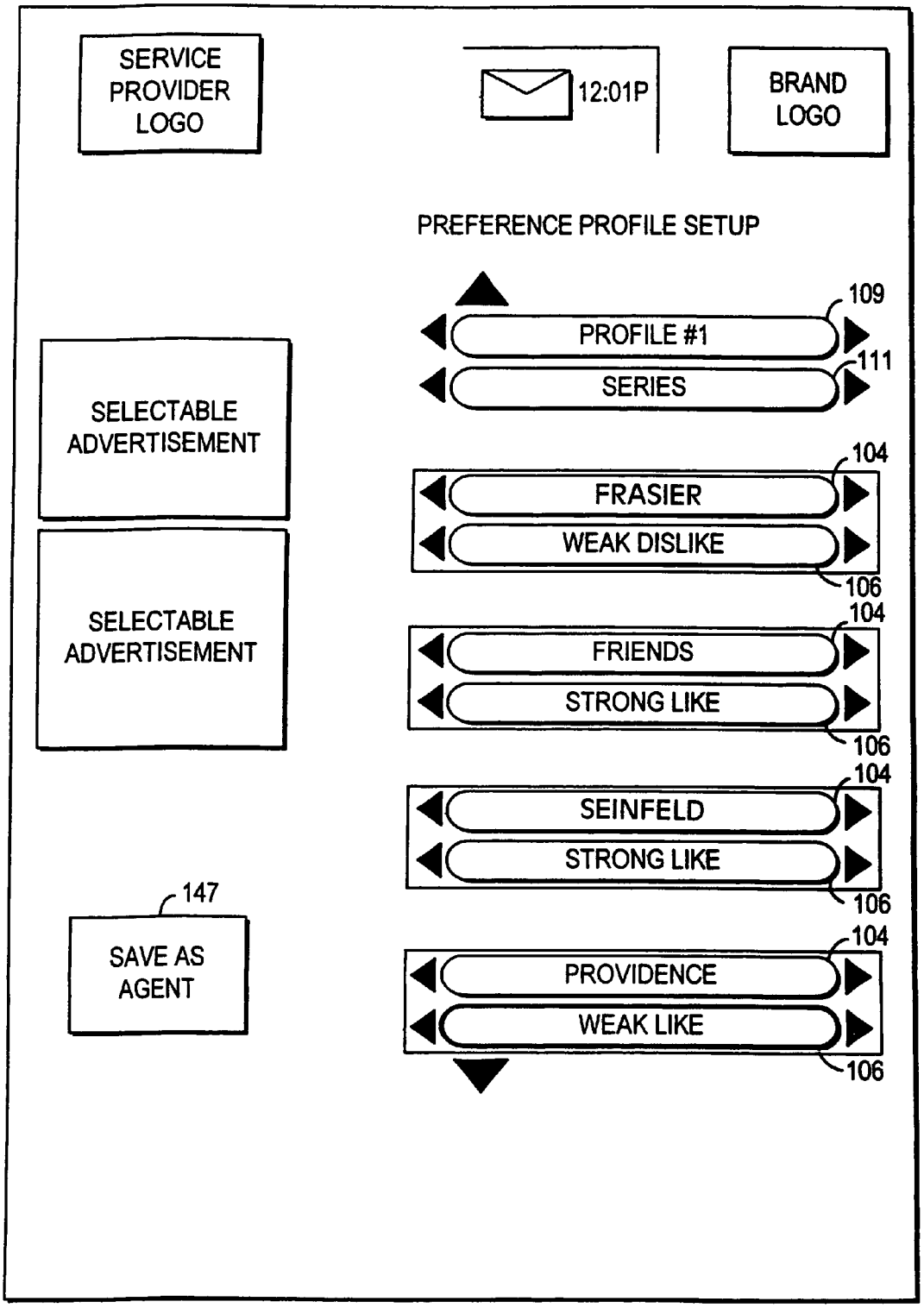
FIGS. 13a–13f show illustrative preference profile screens in accordance with the principles of the present invention.
Figure 13B:
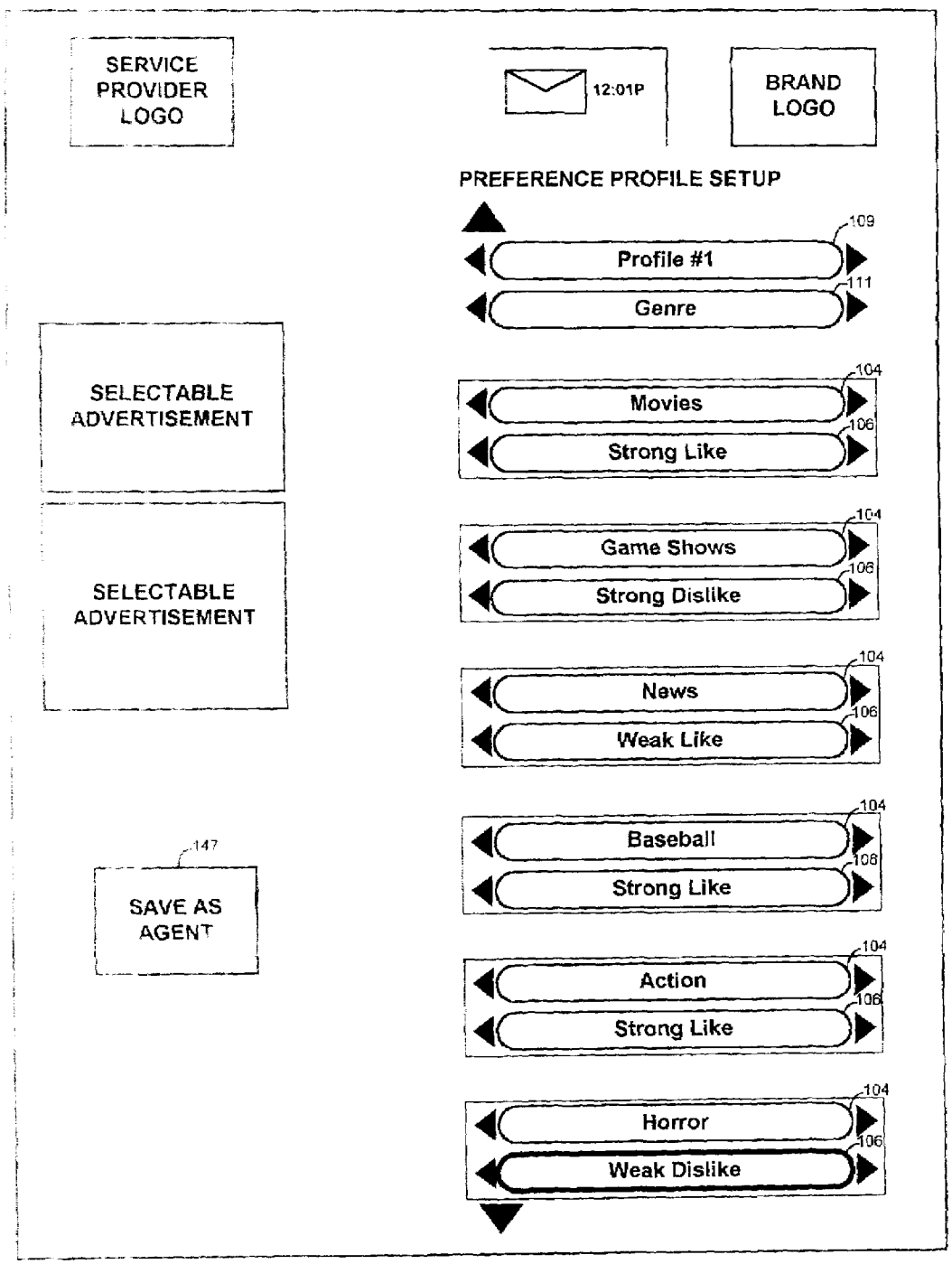
Figure 13C:
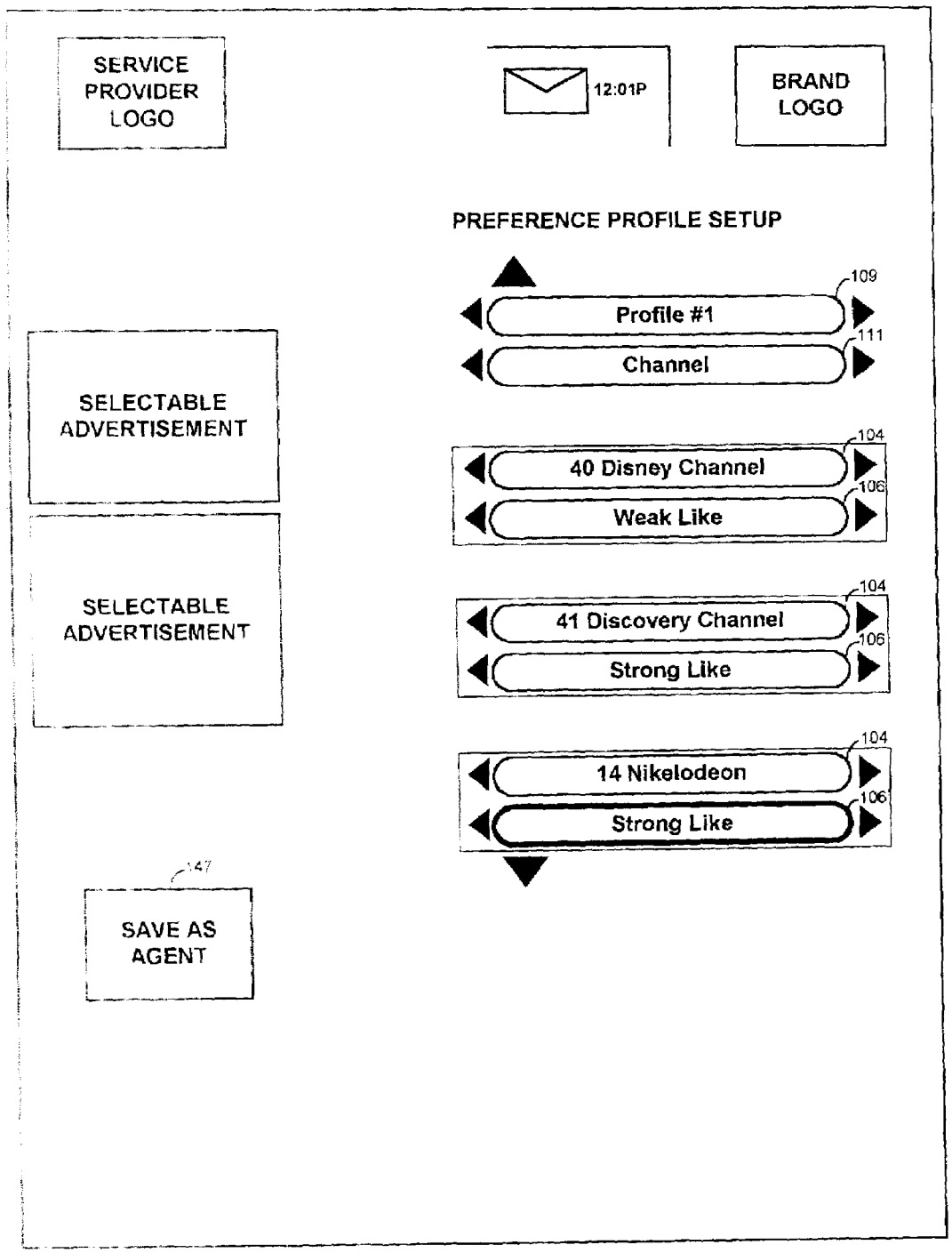
Figure 13D:
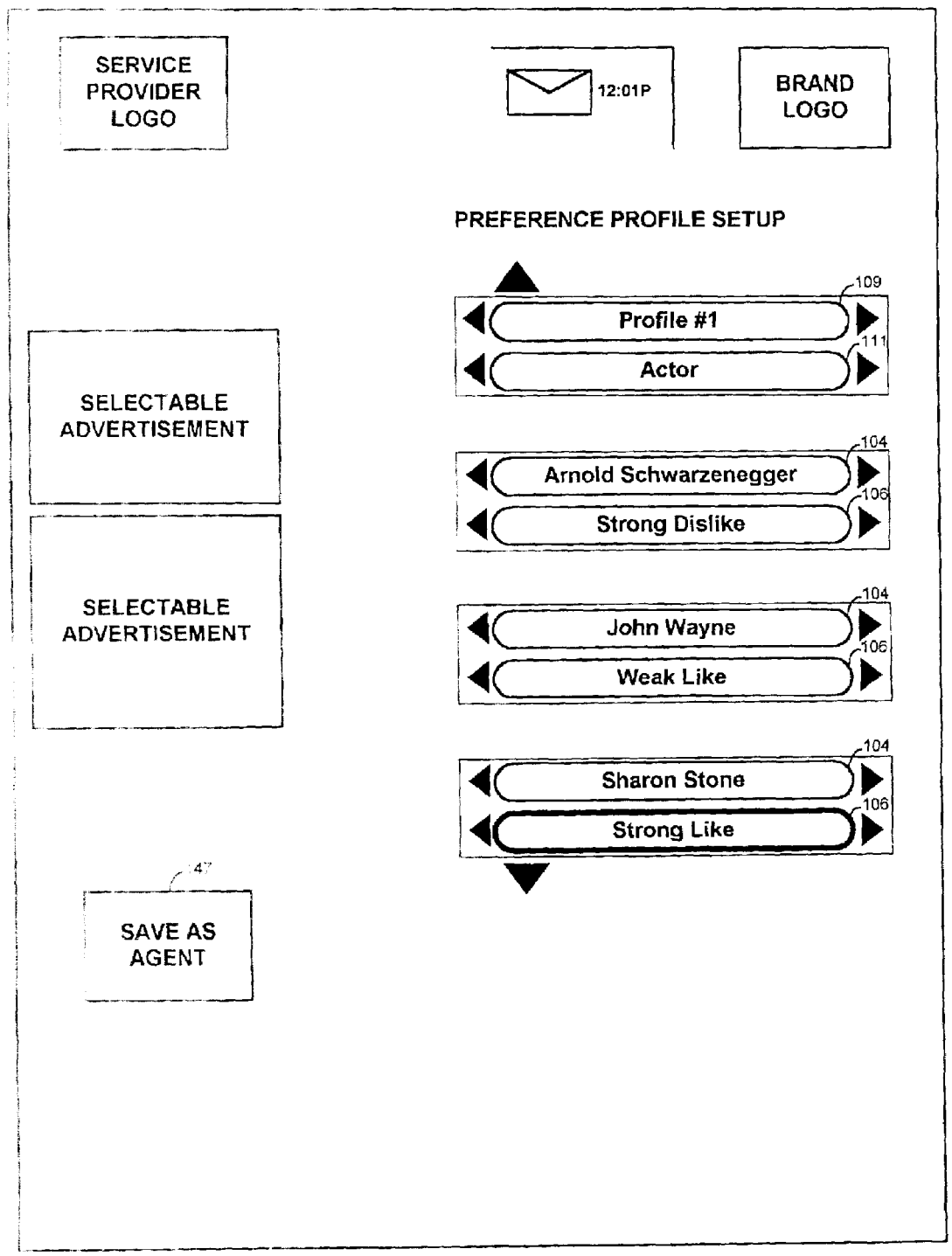
Figure 13E:
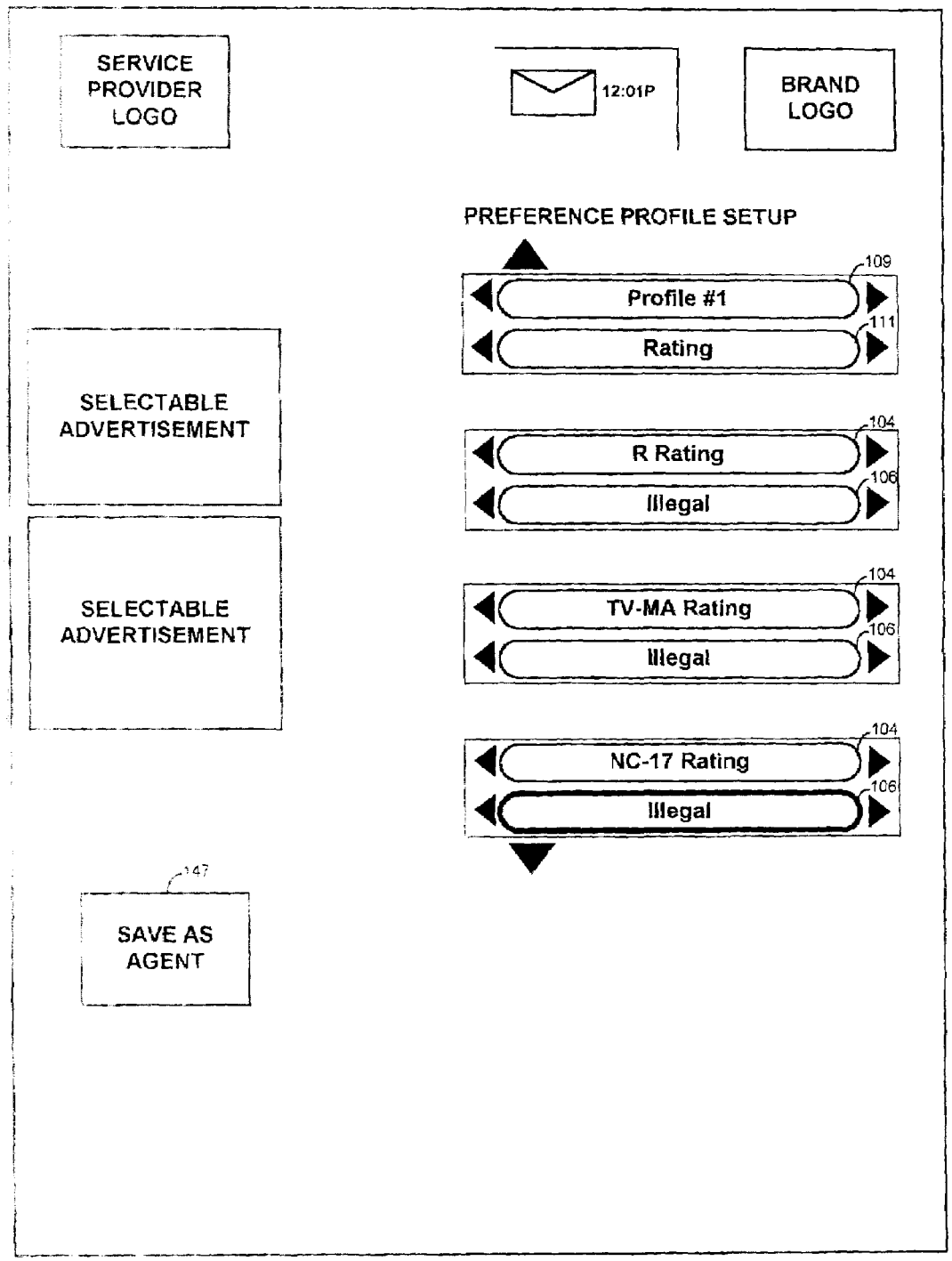
Figure 13F:
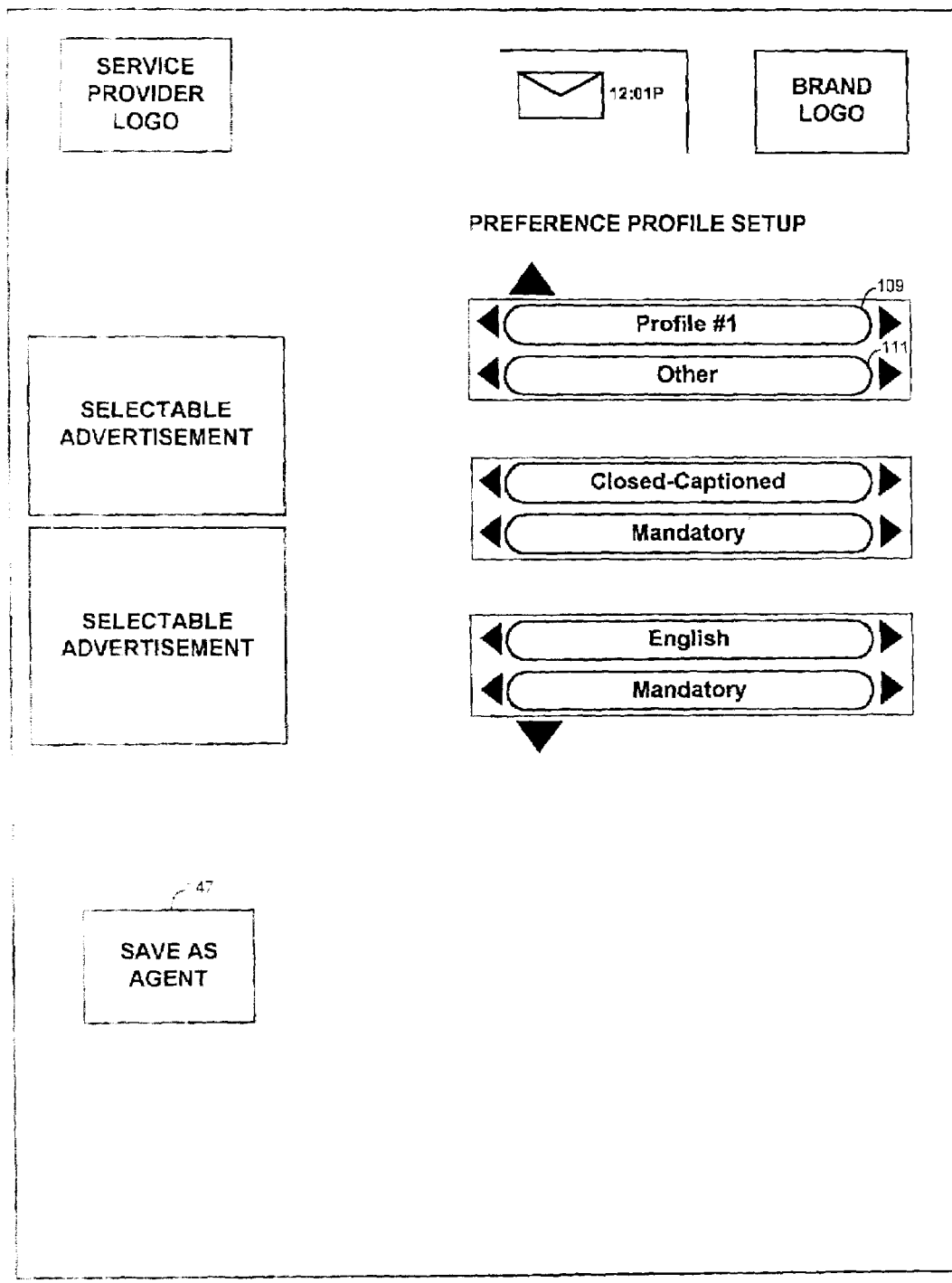

The program guide may also provide users with an opportunity to define user preferences that allow users to customize their program guide experience. Systems in which interactive television program guides provide users with opportunities to define user preference profiles are described, for example, in Ellis et al. U.S. patent application Ser. No. 09/034,934, filed Mar. 4, 1998, which is hereby incorporated by reference herein in its entirety. Users may indicate a desire to set up user preference profiles, for example, by selecting a selectable Setup feature 106 from main menu 102 of FIG. 5. When a user selects a selectable Setup feature 106 from main menu 102, the program guide client may display a setup screen, such as illustrative setup screen 411 of FIG. 12.

Setup screen 411 may provide a user with an opportunity to set up various guide features, set parental control features, set features of set-top box 28 (FIG. 3), set audio features, set the screen position, set user preference profiles, or to set up any other feature or suitable combination of features. The user may indicate a desire to set up a user preference profile by, for example, selecting User Profile feature 417. When the user indicates a desire to set up a user preference profile, the program guide client may display a user preference profile setup screen, such as the preference profile setup screens shown in FIGS. 13*a*–13*f*. This method of defining user profiles is only illustrative, as any suitable method may be used.

In practice, there may be multiple users associated with each user television equipment 22. The program guide may provide users with the ability to set up multiple user preference profiles. Users may switch between user preference profiles by, for example, selecting preference profile selector 109 and arrowing right or left to select the desired user preference profile. In FIGS. 13*a*–13*f*, for example, the user has selected Preference profile #1, which may correspond to a particular user.

User preference profiles may include criteria such as preference attributes 104 and preference levels 106. Preference attributes 104 may be organized by type. Attribute types and attributes may be programmed into the program guide client, or may be retrieved by the program guide client from program guide server 25. In the former approach, the available attribute types and attributes may remain static until the program guide client is updated. In the latter approach, the available attribute types and attributes may be dynamic. Suitable attribute types and attributes may be provided at any time by main facility 12 or television distribution facility 16. Each time a user indicates a desire to set up a user preference profile, the program guide client may query program guide server 25 for the available attribute types and attributes. When a user indicates a desire to set up a user preference profile in either approach, the program guide client may query program guide server 25 for the user preference profiles associated with that program guide client.

FIGS. 13*a*–13*f* show six illustrative views of preference profile setup screens in which the user has selected attribute types by, for example, selecting attribute selector 111 and arrowing right or left until a desired preference attribute type is displayed. For example, FIGS. 13*a*–13*f* illustrate how the program guide may provide a user with an opportunity to set preference levels for series, genres, channels, actors and actresses, ratings, and other types of preference attributes, respectively. The user may select preference attributes by, for example, arrowing down after selecting an attribute type. The user may then arrow right or left until a desired attribute is displayed. After the desired preference attribute is displayed, the user may, for example, arrow down to set a preference level for the attribute. The user may then, for example, arrow right or left to select a suitable preference level.

Preference levels that may be used to indicate the user's interest or disinterest in a given preference attribute include strong like, weak like, strong dislike, weak dislike, mandatory (appropriate, e.g., for closed-captioning for a deaf person), illegal (appropriate, e.g., for R-rated programs for a child) and don't care (neutral). After the user indicates that he or she is finished defining a profile (e.g., by pressing an "OK" key or remote control 40), the program guide client may provide the preference profile data to program guide server 25 for use in providing program guide data. The user may arrow down again to select additional criteria, or arrow up to edit criteria that has already been selected. The user may delete an attribute by, for example, setting its preference level to "don't care."

Figure 14:
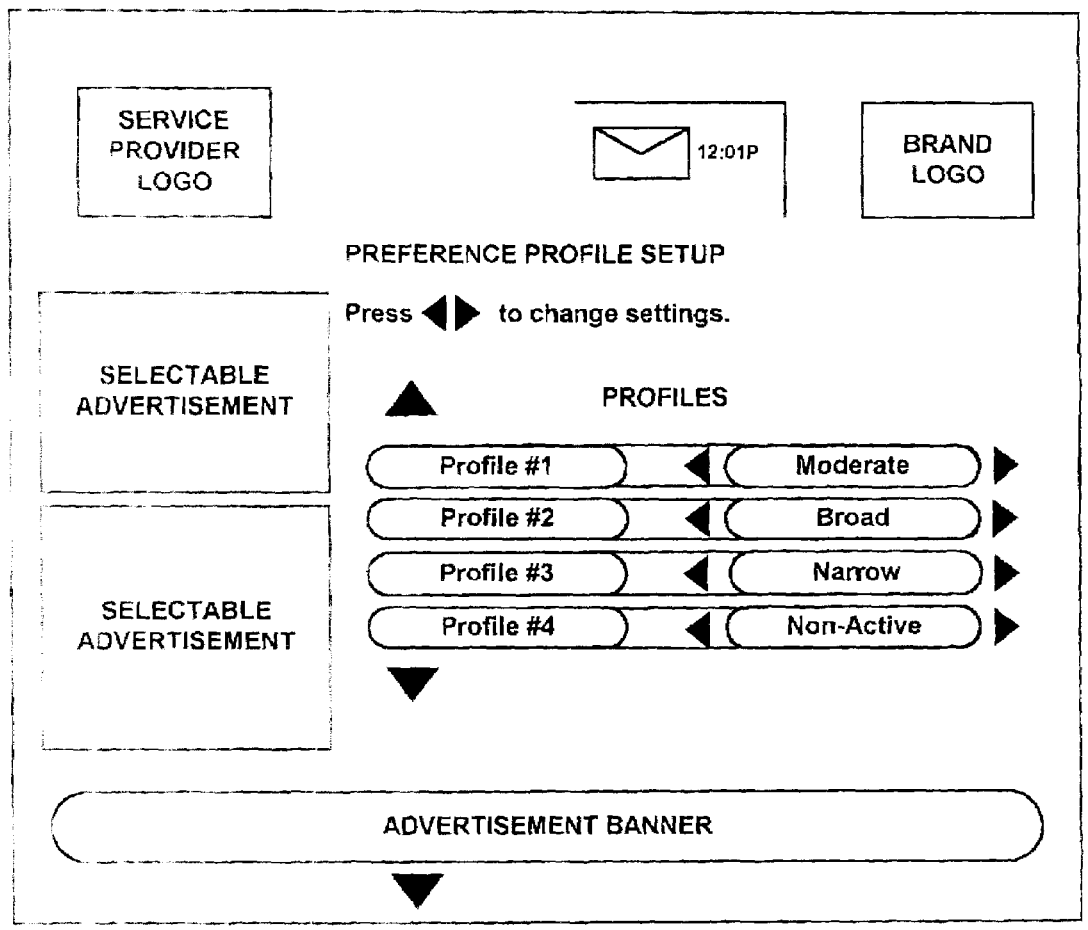
FIG. 14 shows an illustrative profile activation screen in accordance with the principles of the present invention.

The user may activate or deactivate one or more defined preference profiles by, for example, selecting selectable Profile feature 106 from main menu 102 of FIG. 5. The program guide client may respond by, for example, querying program guide server 25 for any defined preference profiles, providing the user with a list of preference profiles, and providing the user with an opportunity to activate or deactivate one or more preference profiles as shown in FIG. 14. A user may deactivate a preference profile by, for example, setting the profile to non-active. A user may set a preference profile as active to varying degrees. For example, a user may set a profile as active by setting the profile to "wide", "moderate", or "narrow" scope.

The program guide client may also indicate to program guide server 25 which profiles are activated or deactivated. The program guide server may use, for example, the attributes of one or more user preference profiles as additional criteria when retrieving data in response to data requests from the program guide client. If multiple preference profiles are used simultaneously, program guide server 25 may reconcile any conflicts using any suitable approach. Interactive television program guide systems that resolve conflicts among multiple active user preference profiles are described, for example, in above-mentioned Ellis et al. U.S. patent application Ser. No. 09/034,934, filed Mar. 4, 1998.

FIG. 15 is a table containing an illustrative list of programs that might be available to a user. The results that appear under the columns labeled "narrow scope", "moderate scope", and "wide scope", show which programs satisfy the preference attributes and preference levels of, for example, Profile #1 as illustratively defined in FIGS. 13*a*–13*f*. In practice, a listings screen generated based on a profile that is set to widest scope may typically include a larger number of program listings depending on the mandatory attributes set by the user.

Figure 16A:
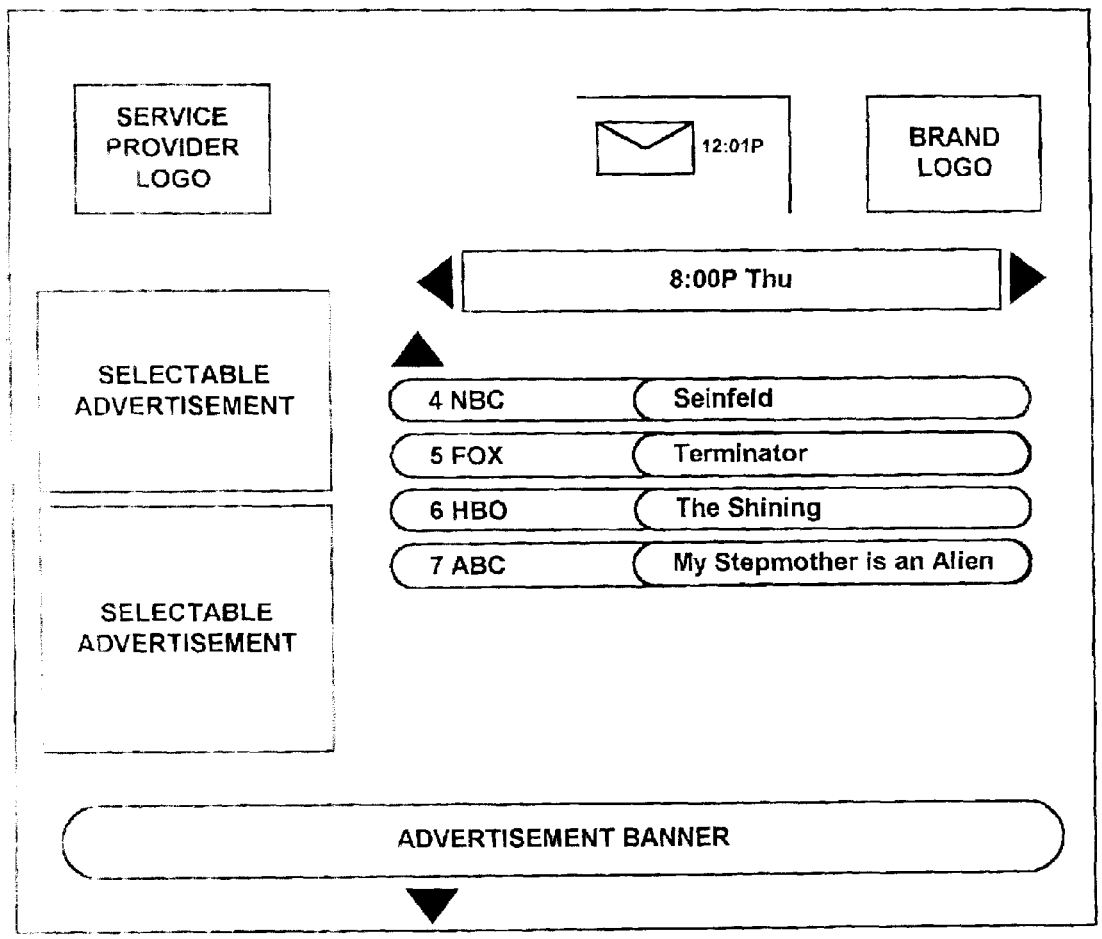
FIGS. 16a–16c are illustrative program listings screens that may be displayed according to the preference profiles of FIGS. 13a–13f in accordance with the principles of the present invention.

When the user activates Profile #1 and sets it to the widest scope, program guide server 25 may provide program guide data for programs that have all mandatory attributes and no illegal attributes. For example, Seinfeld, The Shining, ER, Terminator, and My Stepmother is an Alien are included in the widest preference scope because they have the only mandatory attribute that is specified in Profile #1—closed-captioning (as set in FIG. 13*f*). In addition, they have no preference attributes with a preference level of illegal (R rating, TV-MA rating, or NC-17 rating (as set in FIG. 13*e*). The Night at the Opera is not included because it does not have a mandatory attribute (closed-captioning). Dante's Peak is not included because it has a illegal rating (R). An illustrative program listings screen that may be displayed by the program guide client with such limited data is shown in FIG. 16*a* (ER has not been listed because, presumably, it would be in a different time block).

When the user activates Profile #1 and sets it to the moderate scope, program guide server 25 may provide program guide data for programs that have no preference attributes with an associated preference level of disliked, that have all mandatory attributes, and that have no illegal attributes. The Shining is not included because horrors have a preference level of "weak dislike" (as set in FIG. 13*b*). Dante's Peak is not included because it has an R-rating, which has an attribute level of illegal (as set in FIG. 13*e*). Night at the Opera is not included because it is not closed-captioned, which is a mandatory attribute (as set in FIG. 13*f*). The Terminator, for example is not within the moderate scope of Profile #1 because the preference attribute of horror in Profile #1 has an associated preference level of "weak dislike" and the preference attribute of Schwarzenegger (an actor in the program Terminator) has an associated preference level of "strong dislike" (as set in FIGS. 13*b* and 13*d*, respectively). Seinfeld and ER are included because they do not have any disliked attributes.

Figure 16B:
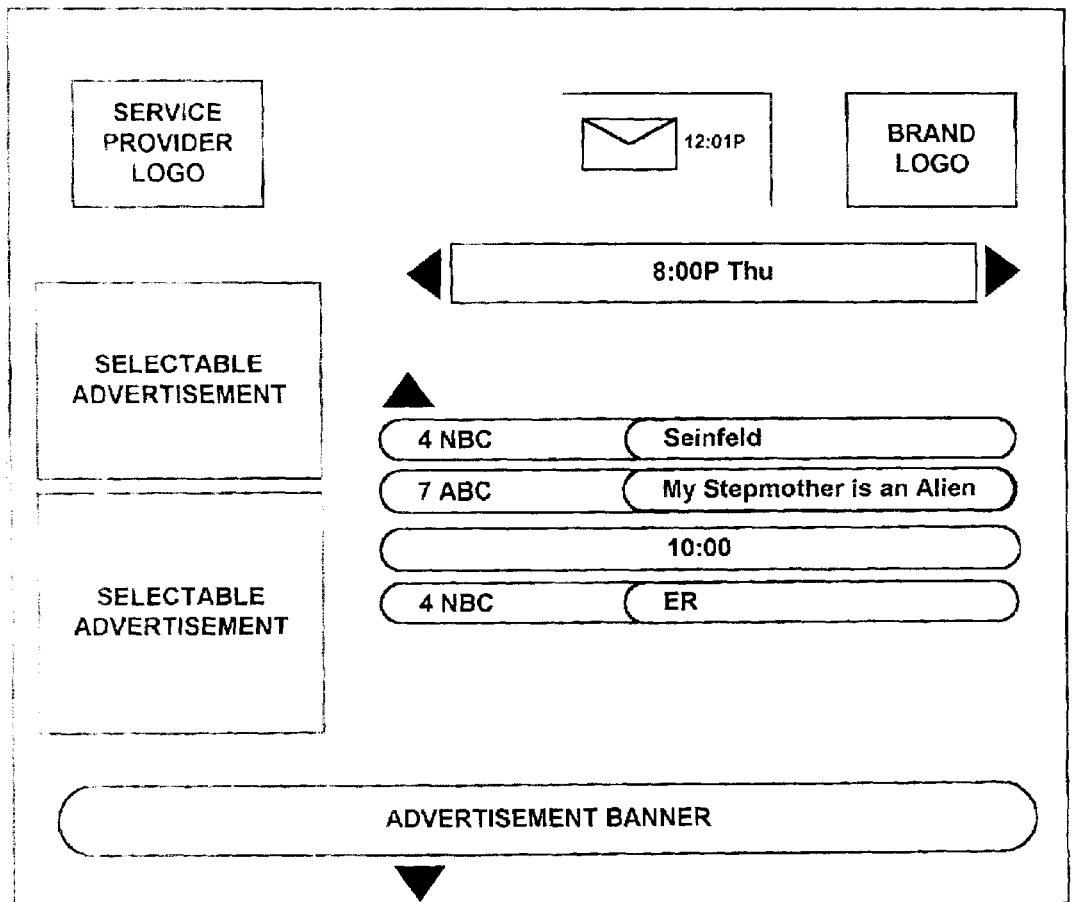

When faced with two different preference levels associated with the same program, the program guide uses the stronger of the two. My Stepmother is an Alien is included, for example, because it has a "strong like" preference attribute that outweighs the "weak dislike". An illustrative program listings screen that may be displayed by the program guide client with such limited program guide data is shown in FIG. 16*b*. In practice, a listings screen generated based on a profile that is set to moderate scope may typically include a larger number of program listings depending on the mandatory attributes set by the user.

Figure 16C:
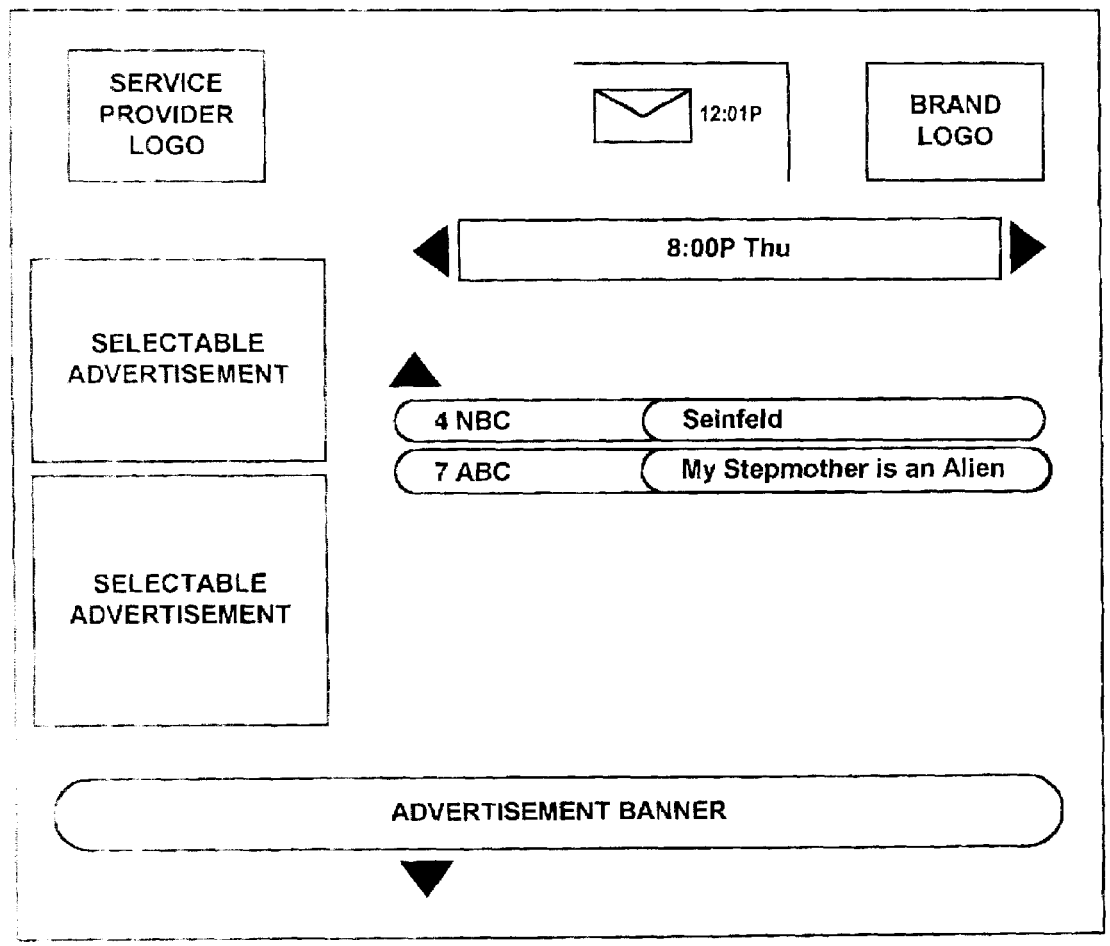

When the user activates Profile #1 and sets it to the narrow preference scope, program guide server 25 may provide program guide data for all liked programs that are not more disliked and that have all mandatory attributes and no illegal attributes. The Shining is not included because it has a weakly disliked attribute, horror. Terminator is not included because it has a strongly disliked attribute, Arnold Schwarzenegger. My Stepmother is an Alien is included because the strongly liked attribute of comedy has priority over the weakly disliked attribute of horror. Dante's Peak is not included because it has a rating of R. Night at the Opera is not included because it is not closed-captioned. ER is not within the narrow scope because it does not have any liked attributes. It is at best, neutral. An illustrative program listings screen that may be displayed by the program guide client with such limited program guide data is shown in FIG. 16*c*.

The program guide may also provide users with an opportunity to schedule reminders using boolean or natural language expressions having one or more criteria. If desired, program guide server 25 may schedule reminders based on user preference profiles and agents. Reminders may be scheduled for individual programs or series of programs. Systems in which reminders are set for series of programs are described, for example, in Knudson et al. U.S. patent application Ser. No. 09/330,792, filed Jun. 11, 1999, which is hereby incorporated by reference herein in its entirety.

Figure 17A:
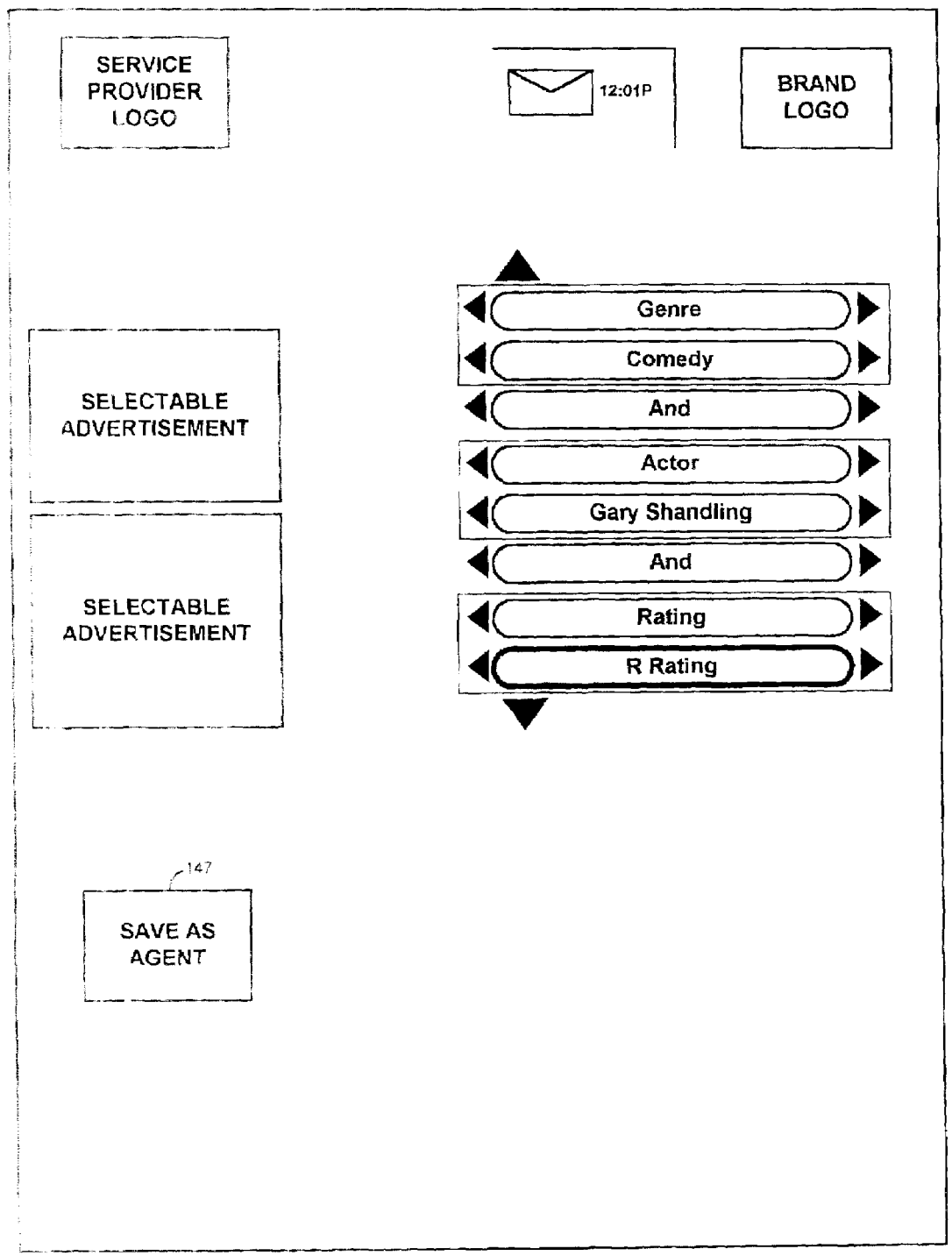
FIGS. 17a and 17b show illustrative criteria screens in accordance with the principles of the present invention.
Figure 17B:
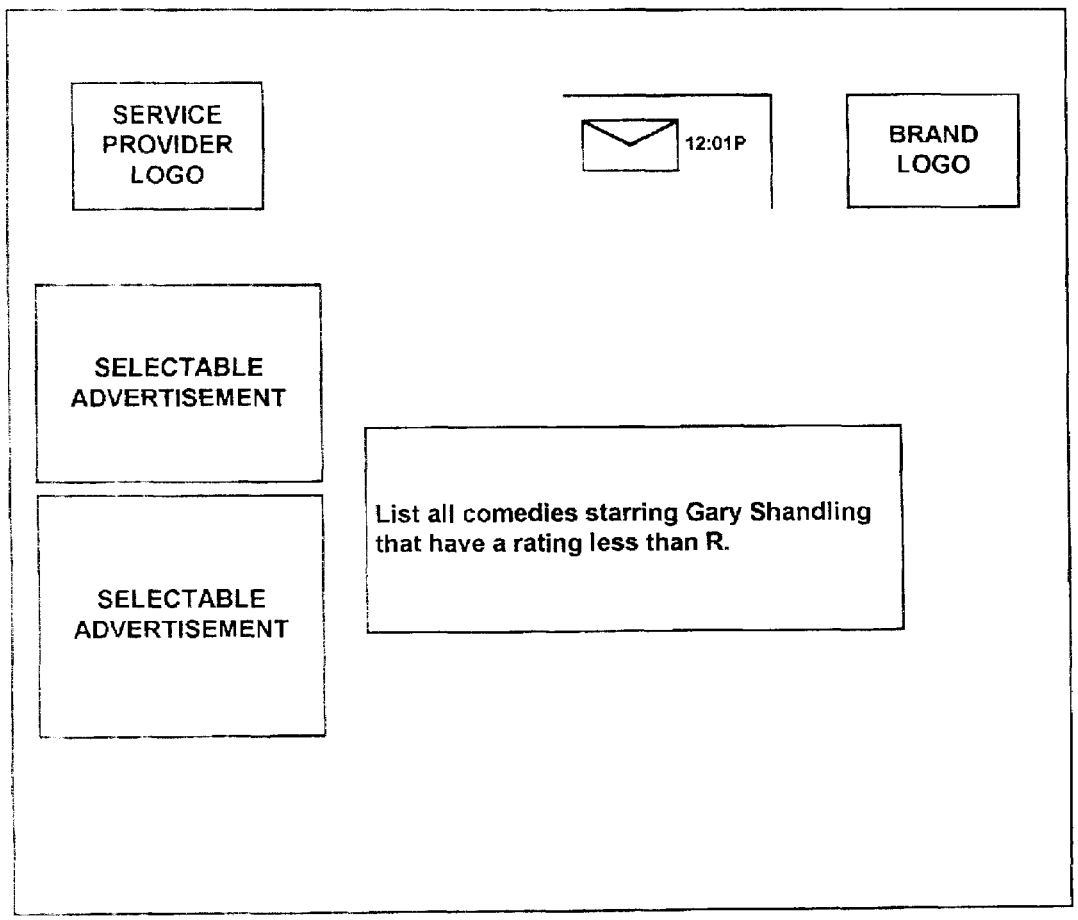

A user may indicate a desire to schedule a reminder by, for example, selecting a selectable Reminders feature 106 from main menu 100 of FIG. 5. In response, the program guide may display a criteria screen. Illustrative criteria screens 161 and 169 are shown in FIGS. 17a and 17b. The program guide client may display criteria screen 161 of FIG. 17a to provide a user with an opportunity to set reminders according to a boolean type expression. The user may construct a boolean expression by selecting criteria such as attribute types, attributes, and logical operators. The user may make such selections, for example, using any suitable combination of right, left, up, or down arrow key sequences to sequence through the attribute types, attributes and logical operators. In the example of FIG. 17a, the user has defined a boolean expression to schedule reminders for comedies that star Gary Shandling and that have a rating less than R. In the example of FIG. 17b, the user has defined a similar natural language expression.

The program guide client may submit the user defined boolean or natural language expression to program guide server 25 for processing. Program guide server 25 may process the expression and schedule reminders for all of the programs that meet the expression. Program reminders may be scheduled using any suitable approach. In one suitable approach, program guide server 25 may store program identifiers and air times and send messages to the program guide client at an appropriate time before a program starts. In another suitable approach, program guide server 25 may process an expression and provide program identifiers and air times to the program guide client. The program guide client may, for example, maintain a list of program identifiers and display program reminders at an appropriate time before the programs start.

Figure 18:
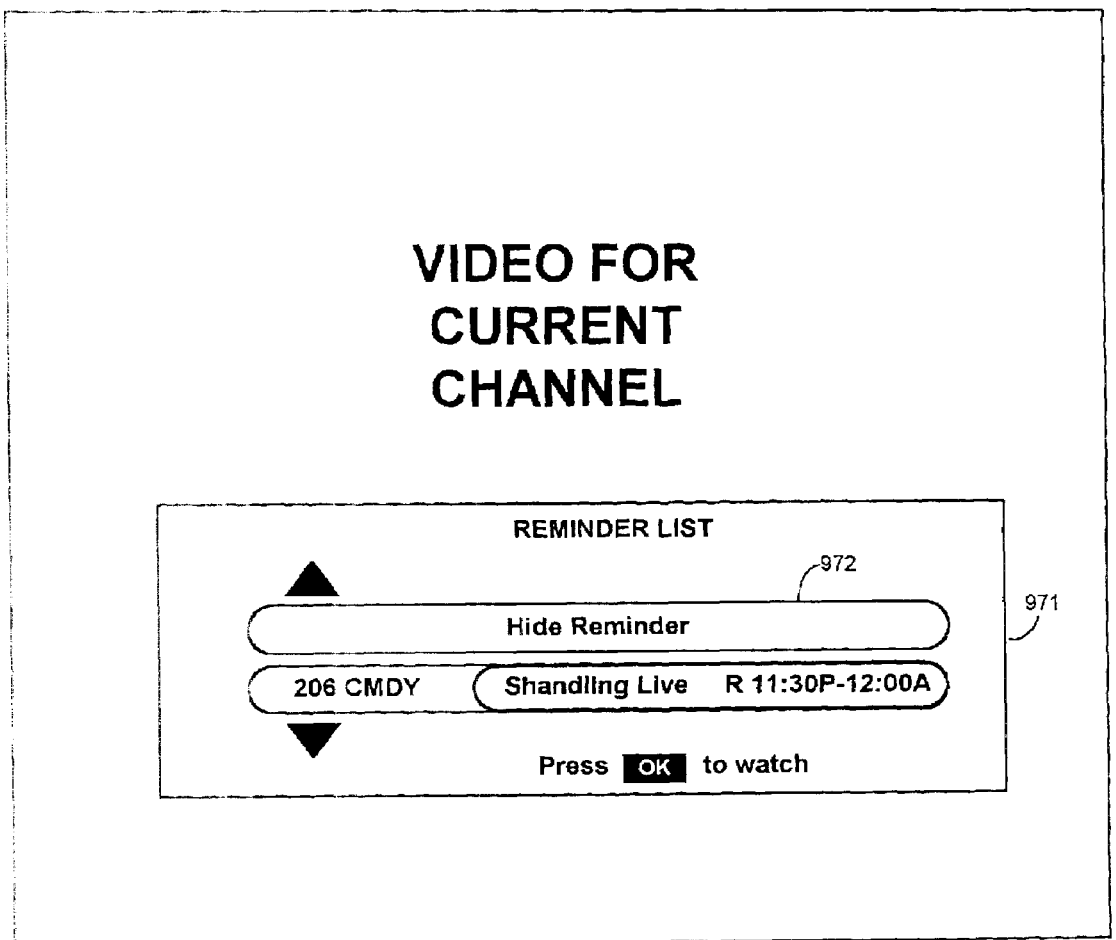
FIGS. 18 and 19 show illustrative program reminder lists generated according to the expressions of FIGS. 17a and 17b in accordance with the principles of the present invention.
Figure 19:
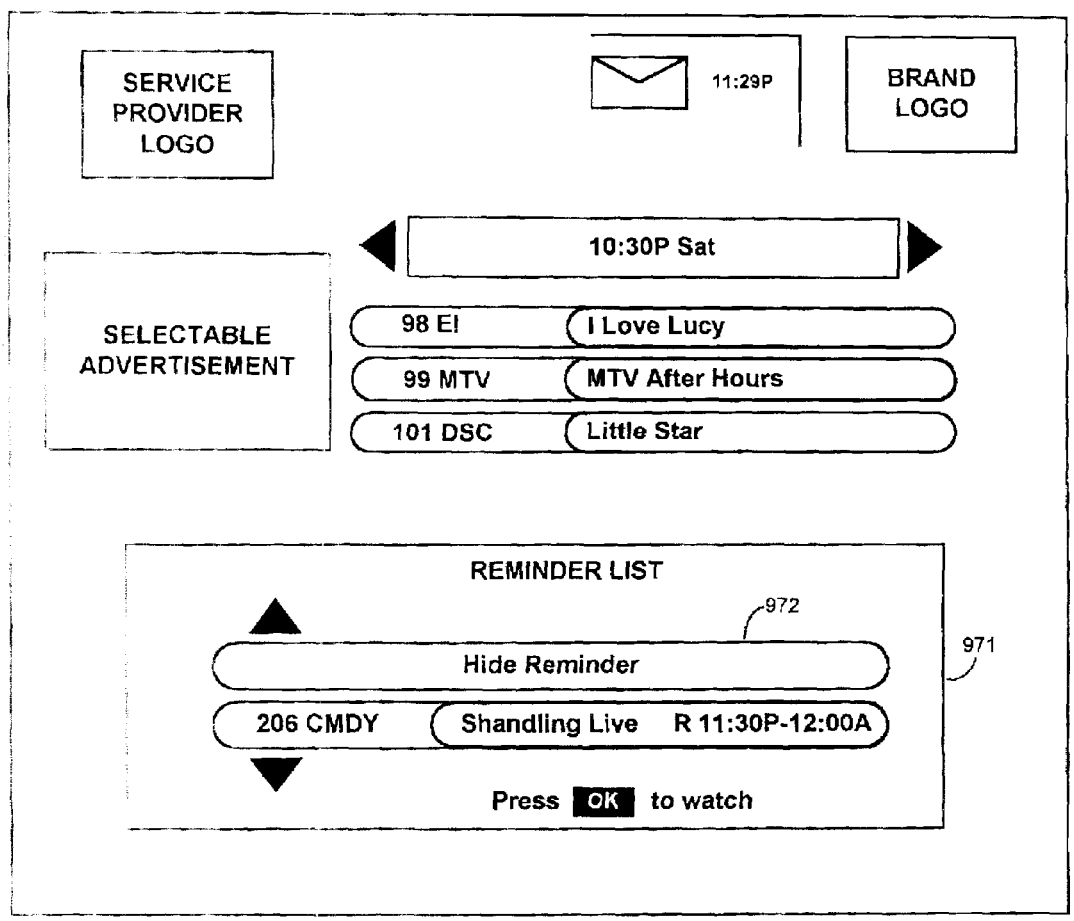

The program guide may remind a user that a program is airing at the time a program airs. In an alternative approach, the program guide may remind a user at some predetermined period of time before the program airs that a program is going to air. FIGS. 18 and 19 show illustrative program reminder lists 171. In FIG. 18, reminder list 171 is overlaid on top of the currently display television program to provide a user with the opportunity to view a reminder while still viewing a portion of the television program that a user is watching. In FIG. 19, reminder list 171 is shown overlaid on top of a program listings display screen. The program guide may provide a user with an opportunity to scroll through reminder list 171 by, for example, using remote control arrow keys. The program guide may hide the reminder list when, for example, a user selects hide reminder feature 172. The guide may also display reminder list 171 if, for example, the user presses an "OK" key at any time while watching TV.

The program guide may also provide users with an opportunity to schedule programs for recording by secondary storage device 47 or digital storage device 49 (FIG. 4) using boolean or natural language expressions. If desired, program guide server 25 may schedule programs for recording based on user preference profiles or agents. Programs may also be scheduled for recording by program guide server 25. Program guide systems in which programs are recorded by a remote server are described, for example, in Ellis et al. U.S. patent application Ser. No. 09/332,244, filed Jun. 11, 1999, which is hereby incorporated by reference herein in its entirety.

A user may indicate a desire to schedule a program for recording by, for example, selecting a selectable Record feature 106 from main menu 102 of FIG. 5. In response, the program guide may display a criteria screen, such as illustrative criteria screens 161 and 169 of FIGS. 17a and 17b. The program guide client may display criteria screen 161 of FIG. 17a to provide a user with an opportunity to schedule a program for recording according to a boolean type expression. The user may construct a boolean expression by selecting criteria such as attribute types, attributes, and logical operators. The user may make such selections, for example, using any suitable combination of right, left, up, or down arrow key sequences to sequence through the attribute types, attributes and logical operators. In the example of FIG. 17a, the user has defined a boolean expression to schedule for recording comedies that star Gary Shandling and that have a rating less than R. In the example of FIG. 17b, the user has defined a similar natural language expression with similar criteria.

The program guide client may submit the user defined boolean or natural language expression to program guide server 25 for processing. Program guide server 25 may process the expression and schedule all of the programs that meet the expression for recording. Recording by program guide server 25 may be performed, for example, as described in above-mentioned Ellis et al. U.S. patent application Ser. No. 09/332,244, filed Jun. 11, 1999. In another suitable approach, program guide server 25 may process the expression and provide program identifiers and air times to the program guide client. The program guide client may, for example, maintain a list of program identifiers and program air times and may instruct optional secondary storage device 47 or digital storage device 49 to record the programs.

The program guide may also provide users with an opportunity to parentally control titles, programs, or channels using boolean or natural language expressions. If desired, program guide server 25 may parentally control programs based on user preference profiles. A user may indicate a desire to parentally control titles, programs, or channels by, for example, selecting a selectable Parents feature 106 from main menu 102 of FIG. 5. In response, the program guide may display a criteria screen, such as illustrative criteria screens 161 and 169 of FIGS. 17a and 17b. The program guide client may display criteria screen 161 of FIG. 17a to provide a user with an opportunity to control programs, for example, according to a boolean type expression. The user may construct a boolean type expression by selecting criteria such as attribute types, attributes, and logical operators. The user may make such selections, for example, using any suitable combination of right, left, up, or down arrow key sequences to sequence through the attribute types, attributes and logical operators. In the example of FIG. 17a, the user has defined a boolean expression to lock out comedies that star Gary Shandling and that have a rating less than R. In the example of FIG. 17b, the user has defined a similar natural language expression with similar criteria.

The program guide client may submit the user defined boolean or natural language expression to program guide server 25 for processing. Program guide server 25 may process the expression, determine all of the programs that meet the expression, and indicate the programs that are locked to the program guide client when providing program listings to the program guide client using a suitable indicator (e.g., "locked" tag contained in the listings information). The program guide client may, for example, indicate that a program is locked by displaying lock indicator 161 when displaying locked listings in a listing screen, as shown, for example, in FIG. 7. By placing the processing and storage burdens of locking programs on program guide server 25 instead of user television equipment 22, more titles may be locked than would otherwise because of the limited processing and storage resources of user television equipment 22. If desired, titles, programs, or channels may also be locked using conventional parental control techniques. Program guide systems that provide users with an opportunity to parentally control titles, programs, or channels are described, for example, in above-mentioned Knudson et al. U.S. patent application Ser. No. 09/357,941 filed Jul. 16, 1999.

Program guide server 25 may also record the viewing histories of users on storage device 56. Viewing histories may be created using any suitable approach. The program guide client may, for example, keep track of all of the programs that a user watches for longer than a predefined time, and record the household that the guide client is running in, the current active preference profile or profiles, the program (or its identifier), and how long the user watched the program. The program guide client may also track when users order pay-per-view programs, record programs, and schedule reminders for programs, and may also provide this information to program guide server 25 as part of the viewing histories. Other types of information may also be included in the viewing histories. User defined expressions, for example, may be stored by program guide server 25 to track what types of programs users search for. In addition, user demographic values may be calculated by program guide server 25 and used to more accurately target advertisements or recommend programs. Systems in which user demographic values are calculated are described, for example, in Knudson et al. U.S. patent application Ser. No. 09/139,777, filed Aug. 25, 1998, which is hereby incorporated by reference herein in its entirety.

The program guide client may provide the viewing history information to program guide server 25 continuously (e.g., each time the program guide client determines that a user has watched a program for the predefined time), periodically, in response to polls or requests from program guide server 25, or with any other suitable frequency. If desired, the program guide client may also monitor advertisement usage, such as what selectable advertisements users have selected. Program guide systems in which user viewing activities and advertisement usage are tracked are described, for example, in Thomas et al. U.S. patent application Ser. No. 09/139,798, filed Aug. 25, 1998, which is hereby incorporated by reference herein in its entirety.

The program guide may process user profiles along with the viewer histories to present a more customized viewing experience to the user. The program guide may, for example, identify which programs or series episodes users have watched. Program guide server 25 may, for example, identify episodes that users have not yet watched and may indicate such episodes to the program guide client when the program guide client requests program listings. The program guide client in turn may indicate that a program is new to a household by, for example, displaying a suitable icon or changing the display characteristics of a listing (e.g., changing its color). FIG. 7 shows, for example, the display of New indicator 159 in list 129 to indicate to a user that the user has not seen a particular episode of Saturday Night Live. Program guide server 25 may also calculate ratings, such as Nielsen ratings, based on the viewing histories and provide such information to interested parties.

The program guide may also use the viewing history and user preferences to target the user with advertisements. Program guide systems in which users are targeted with advertisements are described, for example, in Knudson et al. U.S. patent application Ser. No. 09/034,939, filed Mar. 4, 1998, which is hereby incorporated by reference herein in its entirety. Targeted advertisements may contain text, graphics, or video. Targeted advertisements may also be active objects containing various user-selectable options. For example, a targeted advertisement may allow the user to request that additional information on a product be mailed to the user's home, may allow the user to purchase a product, or may allow the user to view additional information on a product using the program guide. Targeted advertisements may be displayed in any suitable program guide display screen. The program guide client may, for example, display targeted advertisements in criteria or profile screens based on a displayed criteria, profile, or agent. Selectable advertisements 108 and advertisement banner 110, for example, may be targeted advertisements.

The program guide may make personalized viewing recommendations based on the viewing histories, preference profiles, or any suitable combination thereof. Program guide server 25 may, for example, construct relational database expressions from the viewing histories that define expressions for the program categories and ratings for programs that users have watched, scheduled reminders for, searched for, or ordered the most. Program guide server 25 may then apply user preference profile criteria to the programs, and generate personal viewing recommendations. In still another suitable approach, program guide server 25 or the program guide client may filter viewing recommendations that are generated by main facility 12 or television distribution facility 16 based on similar expressions, profiles, viewing histories, etc.

Figure 20A:
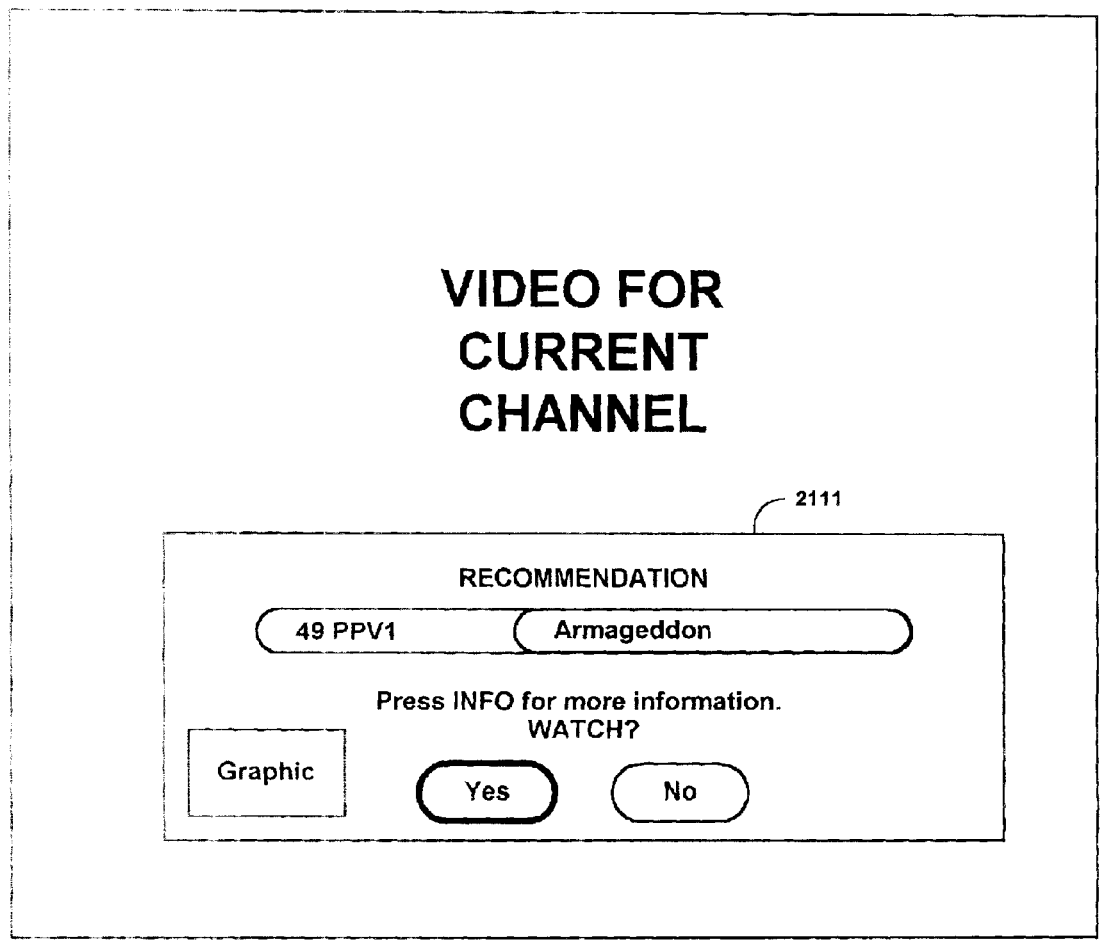
FIGS. 20a and 20b show an illustrative viewer recommendation overlay, in accordance with the principles of the present invention.
Figure 20B:
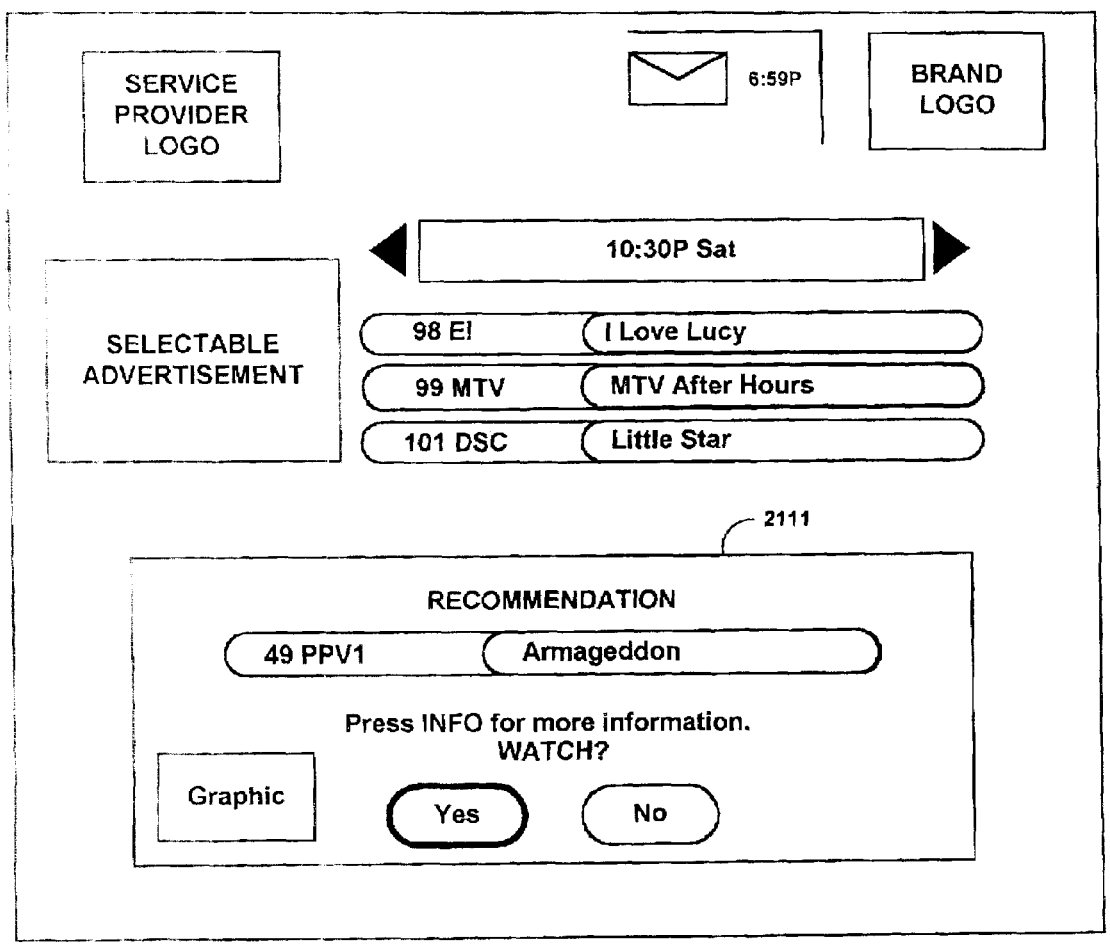
Figure 20C:
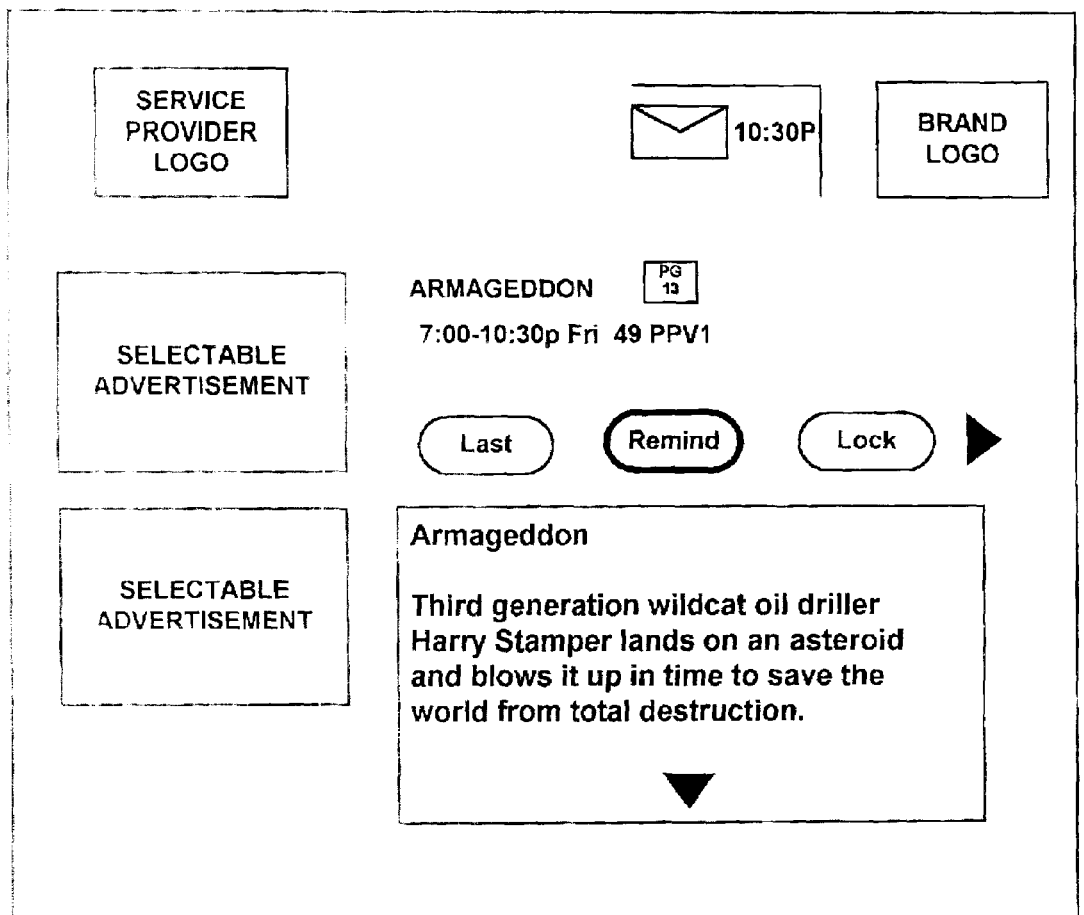
FIG. 20c shows an illustrative additional information screen in accordance with the principles of the present invention.

Assume, for the purpose of illustration, that a user has run the expression illustrated in FIGS. 9a and 9b, and has set the user profiles of FIGS. 13a–13f, program guide server 25 may determine that the movie Armageddon meets the criteria of the expression that was run, and also meets the criteria of the current user profile. Armageddon is a movie (strong like), an action (strong like), and does not have an illegal rating (it is rated PG-13). Program guide server 25 may indicate the movie Armageddon (or its identifier) and its air time to the program guide client and indicate to the client (e.g., using a second identifier) that a viewer recommendation for the movie is to be displayed. The program guide client may display a viewer recommendation overlay, such as overlay 2111 shown in FIGS. 20a and 20b, over a program the user is watching or over a program guide display screen, respectively. The user may press a suitable key on remote control 40 (e.g., an "info" key) to access additional information for a recommended program. An illustrative additional information screen is shown in FIG. 20c. Additional program information screens are described, for example, in above-mentioned Knudson et al. U.S. patent Application Ser. No. 09/357,941 filed Jul. 16, 1999. The program guide client may tune user television equipment 22 to the channel on which a recommended viewing is aired when, for example, a user selects "Yes". If desired, recommendations may include a suitable graphic, such as a graphic indicating the recommended program.

FIGS. 21–24 show flowcharts of illustrative steps involved in performing various aspects of the present invention. The steps shown in FIGS. 21–24 are only illustrative, and may be performed in any suitable order.

Figure 21:
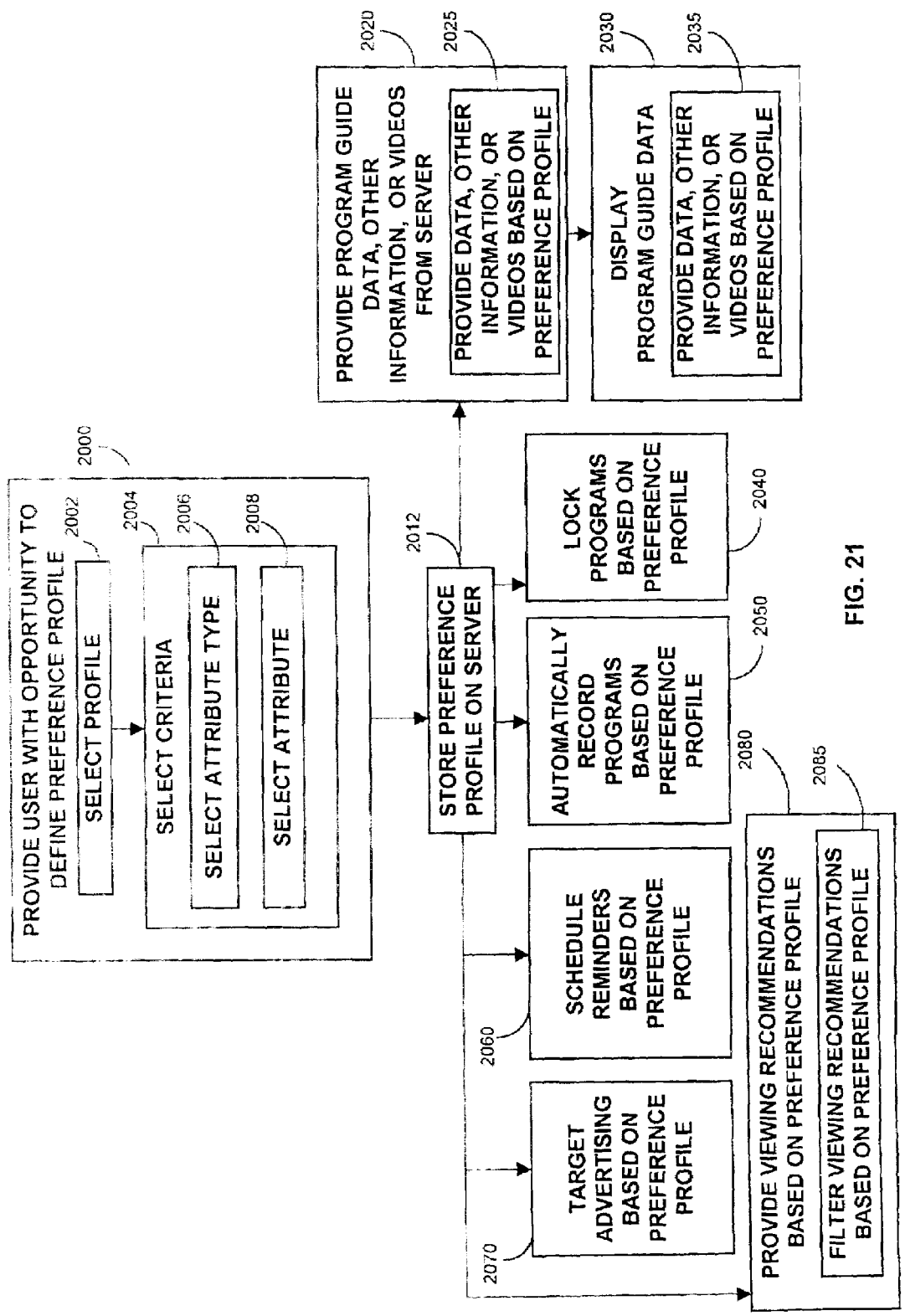
FIG. 21 is a flowchart of illustrative steps involved in providing users with an opportunity to define preference profiles and access program guide data according to the preference profiles in accordance with the principles of the present invention.

FIG. 21 shows a flowchart of illustrative steps involved in storing preference profiles on program guide server 25. If desired, the steps shown may be performed in a client-server interactive program guide system in which users are not required to navigate the Internet. At step 2000, the program guide client running on user television equipment 22 provides a user with an opportunity to define a preference profile. The preference profile may include user selected or defined levels of desirability of various program characteristics, such as genre and rating. Users may define preference profiles by, for example, selecting a profile (step 2002) and selecting criteria (step 2004) such as attribute types (step 2006) and attributes (step 2008). Preference profiles may, for example, be created as database files (e.g., SQL files) containing suitable database expressions that are provided to program guide server 25. Program guide server 25 may store the preference profiles at step 2012.

Program guide data is provided from program guide server 25 to the program guide client and is displayed by the program guide client at steps 2020 and 2030, respectively. Program guide server 25 or the program guide client may use preference profiles to filter out undesirable program guide data. This may be accomplished using any suitable approach. Program guide server 25 may, for example, only provide program listings information or other program guide data that meets the preference profile or profiles to the program guide client (step 2025). Alternatively, program guide server 25 may provide program guide data, other information, or videos to the program guide client and the program guide client may filter the data, other information, or videos by displaying only those elements that meet the preference profile or profiles (step 2035).

Program guide server 25 may perform additional functions based on preference profiles if desired. Program guide server 25 may, for example, lock programs according to preference profiles (step 2040), automatically record programs according to preference profiles (step 2050), schedule reminders based on preference profiles (step 2060), or target advertising based on preference profiles (step 2070). If desired, program guide server 25 may also provide viewing recommendations based on preference profiles at step 2080. Step 2080 may also include filtering viewing recommendations based on preference profiles provided by main facility 12 or television distribution facility 16 (step 2085).

Figure 22:
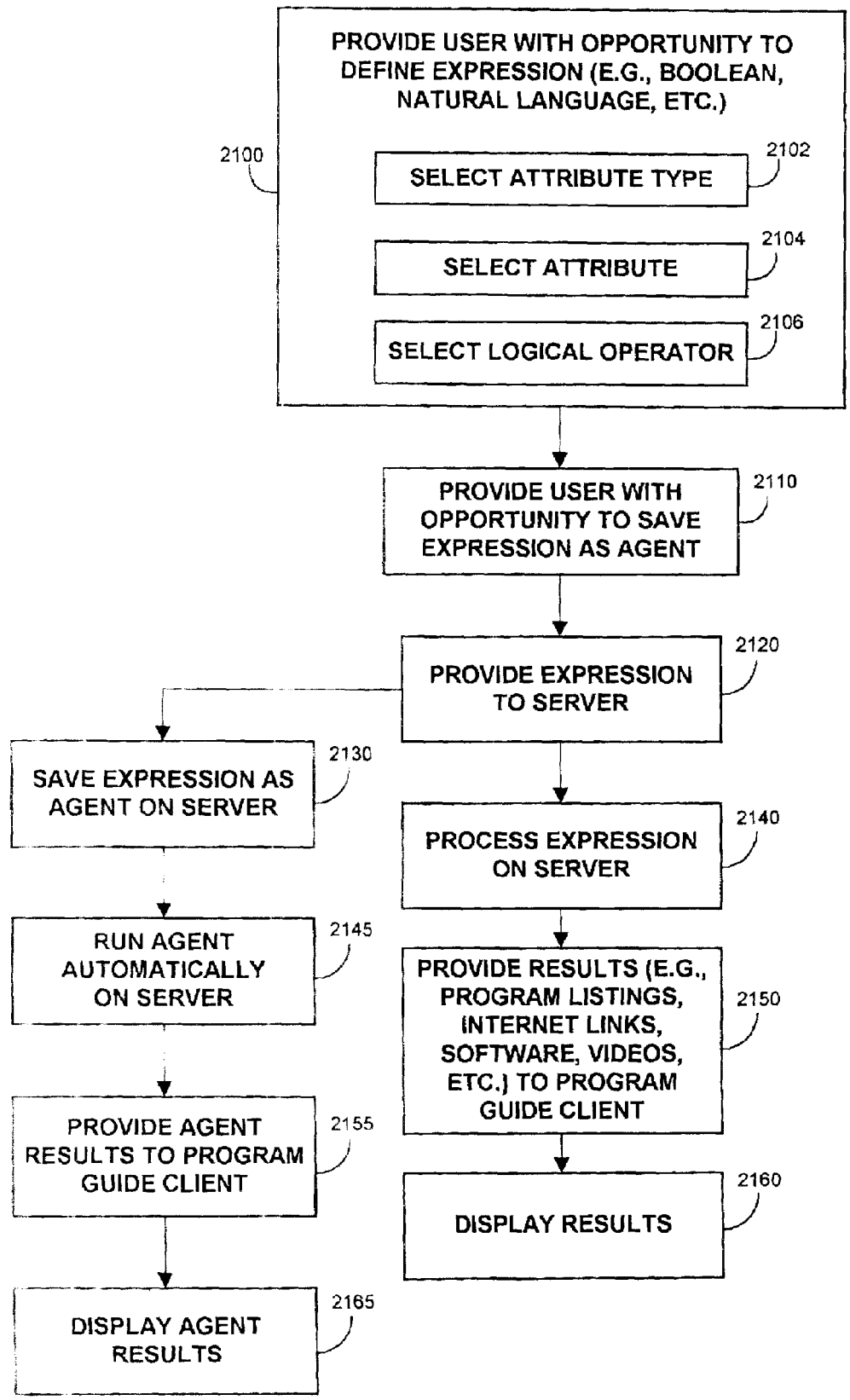
FIG. 22 is a flowchart of illustrative steps involved in providing users with an opportunity to search program guide data, other information, and videos in accordance with the principles of the present invention.

FIG. 22 is a flowchart of illustrative steps involved in providing users with an opportunity to search program guide data in accordance with the principles of the present invention. If desired, the steps shown may be performed in a client-server interactive program guide system in which users are not required to navigate the Internet. At step 2100, the program guide client provides a user with an opportunity to define an expression, such as a boolean or natural language expression. This may include, for example, providing a user with an opportunity to select attribute types, attributes, and logical operators (steps 2102, 2104, and 2106, respectively). The user may also be provided with an opportunity to save the expression as an agent (step 2110). The program guide client provides the expression to program guide server 25 for processing at step 2120. The program guide client may for example, provide a boolean or natural language expression in a text file. Alternatively, the program guide client may construct suitable database expressions and provide the expressions to program guide server 25 as one or more suitable database files (e.g., as SQL files).

If the user indicated a desire to save an expression as an agent at step 2110, program guide server 25 may save the expression as an agent at step 2130. Otherwise, program guide server 25 may process the expression (step 2140) using any suitable approach. This may depend on how the expression was provided by the program guide client. If boolean or natural language expressions were provided as text files, for example, program guide server 25 may parse the expressions and construct a suitable database expression. Alternatively, database expressions may have been provided by the program guide client. In either approach, program guide server 25 may search its database or databases at other facilities for program guide data (e.g., program listings, additional program information, etc.), other information (e.g., software, Internet links, etc.), or videos (e.g., video-on-demand videos) and may provide the results to the program guide client at step 2150. At step 2160 the program guide client may display the results on user television equipment 22.

If the user indicated a desire to save the expression as an agent at step 2110. Program guide server 25 may save the expression as an agent using any suitable approach. Agents may be maintained, for example, in a database that program guide server 25 monitors periodically. If desired, the agent may be forwarded to other servers at other facilities, thereby providing a user with the ability to monitor multiple databases for program guide data, other information, or videos. Agents may be run automatically (e.g., databases may be queried) on one or more servers at step 2145. Step 2145 may be performed periodically, each time a database is updated, or with any other suitable frequency. Program guide server 25 may provide its results and the results of other servers (if desired) to the program guide client at step 2155. The program guide client may display the results at 2165. The results may be displayed, for example, in the form of reminders for which reminder information was provided at step 2155.

Figure 23:
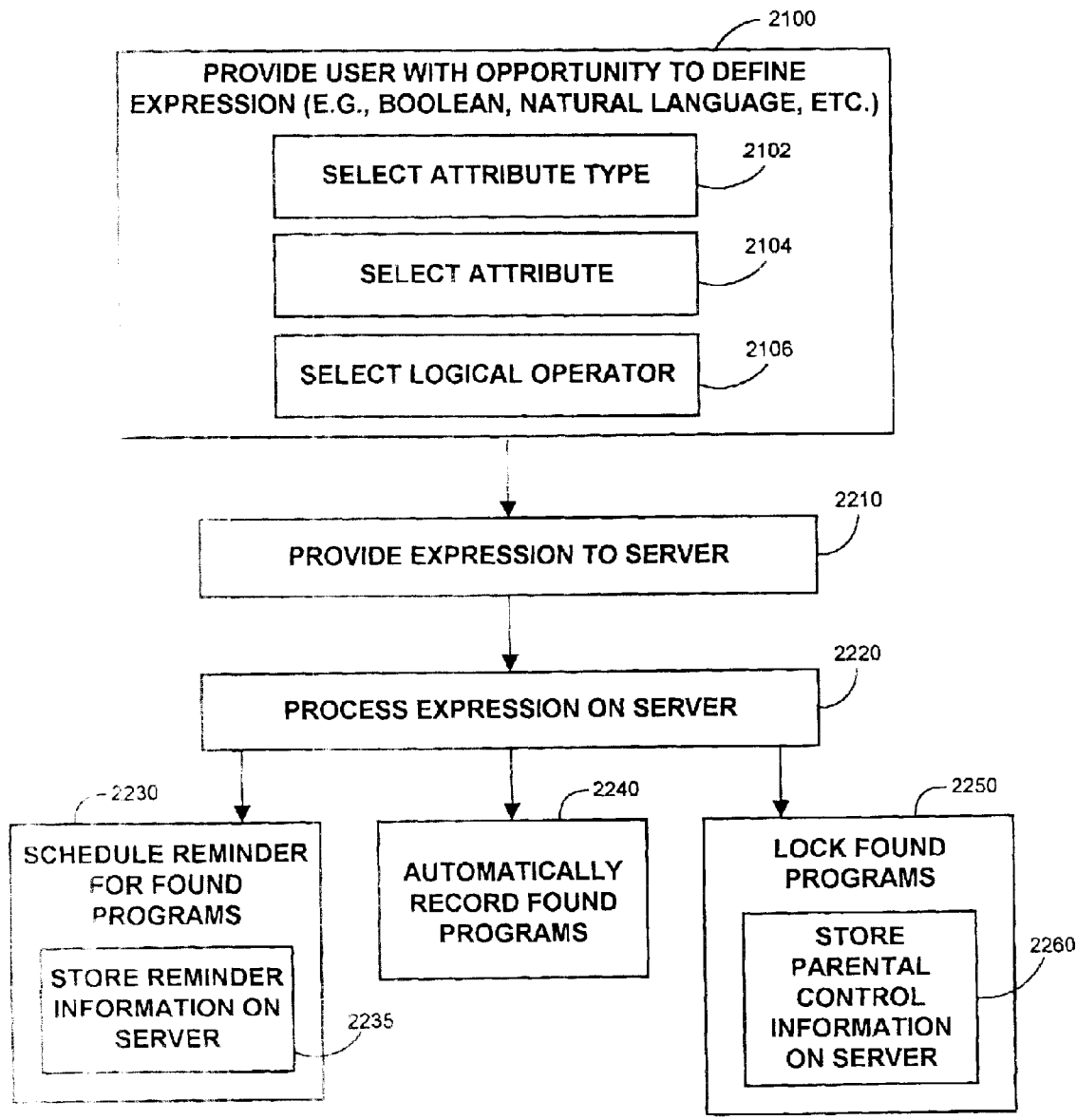
FIG. 23 is a flowchart of illustrative steps involved in processing and using expressions in accordance with the principles of the present invention.

FIG. 23 shows a flowchart of illustrative steps involved in processing and using expressions on program guide server 25 in accordance with the principles of the present invention. If desired, the steps shown may be performed in a client-server interactive program guide system in which users are not required to navigate the Internet. The program guide client provides users with an opportunity to define an expression (e.g., boolean or natural language expressions) at step 2100. This may include, for example, providing a user with an opportunity to select attribute types, attributes and logical operators (steps 2102, 2104, and 2106, respectively). The program guide client provides the expression to program guide server 25 for processing at step 2210 as any suitable type of file. The program guide client may for example, provide a boolean or natural language expression in a text file. Alternatively, the program guide client may construct suitable database expressions and provide the expressions to program guide server 25 as one or more suitable database files (e.g., as SQL files).

Program guide server 25 may process the expression (step 2220) using any suitable approach depending on how the expression was provided to program guide server 25 from the program guide client. If boolean or natural language expressions were provided as text files, for example, program guide server 25 may parse the expressions and construct a suitable database expression. Alternatively, database expressions may have been provided to program guide server 25 from the program guide client. In either approach, program guide server 25 may search its database or databases at other facilities and may provide the results to the program guide client or use the results to perform any suitable program guide function.

Reminders may be scheduled based on the results of the search (step 2230). Program guide server 25 may, for example, store reminder information (e.g., program identifiers and air times) at step 2235 and send messages to the program guide client at an appropriate time before a program starts. In another suitable approach, program guide server 25 may process an expression and provide program identifiers and air times to the program guide client. The program guide client may, for example, maintain a list of program identifiers and display program reminders at an appropriate time before the programs start.

Programs may also be automatically recorded by program guide server 25 or user television equipment 22 based on the results of the expression (step 2240). Program guide server 25 may, for example, provide program identifiers and air times to the program guide client. The program guide client may, for example, maintain a list of program identifiers and program air times and may instruct optional secondary storage device 47 or digital storage device 49 to record the programs at the appropriate time.

Programs may be parentally locked based on the expression results (step 2250). Program guide server 25 may, for example, store parental control information (e.g., program identifiers in a database, table, or list of programs to be locked) at step 2260. Program guide server 25 may indicate to the program guide client that programs are locked when providing program listings to the program guide client. Alternatively, program guide server 25 may indicate to the program guide client the programs that were found as a result of the expression. The program guide client may lock the programs locally using any suitable approach. The program guide client may, for example, indicate that a program is locked by displaying lock indicator 161 when displaying locked listings in a listing screen, as shown, for example, in FIG. 7.

Figure 24:
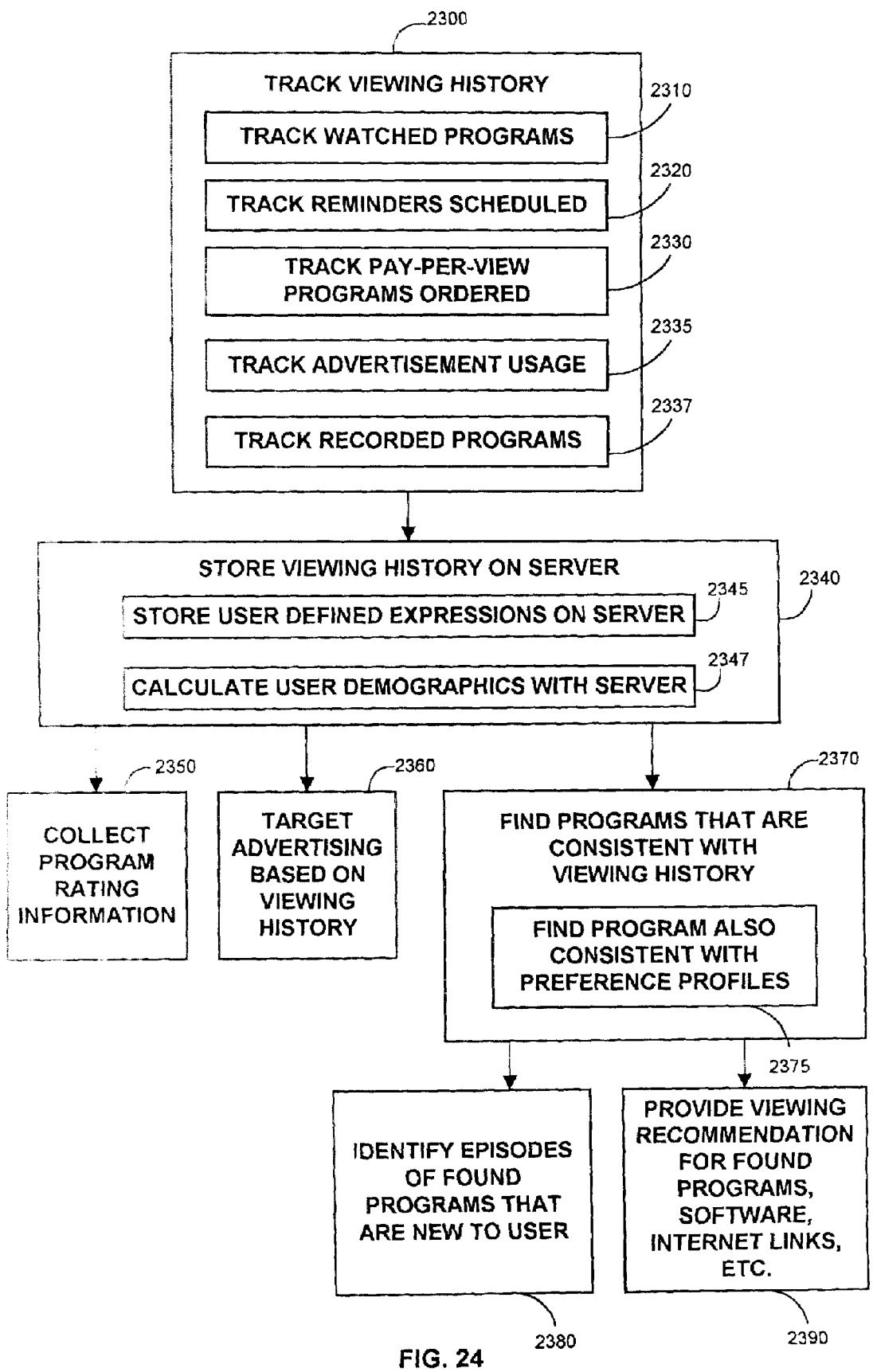
FIG. 24 is a flowchart of illustrative steps involved in tracking and using viewing histories in accordance with the principles of the present invention.

FIG. 24 shows a flowchart of illustrative steps involved in tracking and using viewing histories in accordance with the principles of the present invention. If desired, the steps shown may be performed in a client-server interactive program guide system in which users are not required to navigate the Internet. Viewing histories are tracked at step 2300. This may include tracking programs that users watch (step 2310), tracking reminders scheduled by a user with program guide server 25 or using conventional techniques (step 2320), tracking pay-per-view programs that the user orders (step 2330), advertisement usage (step 2335), track recorded programs (step 2337), track any other suitable user activity, or any suitable combination thereof. The program guide client may provide the viewing history information to program guide server 25 continuously (i.e., each time the program guide client determines that a user has watched a program for the predefined time), periodically, in response to polls or requests from program guide server 25, or with any other suitable frequency.

The viewing history tracked in steps 2310–2335 may be stored on program guide server 25 at step 2340. If desired, user-defined expressions that are processed by program guide server 25 may also be stored on program guide server 25 (step 2345). User demographic values may be calculated by program guide server 25 at step 2347. The viewing history and its expressions and user demographic values may be used by program guide server 25 to perform any suitable function. Program guide server 25 may, for example, collect program rating information (step 2350), or target advertising (step 2360).

Program guide server 25 may search its or another server's database for programs that are consistent with the viewing history (step 2370). If desired, program guide server 25 may find programs that are also consistent with preference profiles stored by program guide server 25 (step 2375). Program guide server may perform any suitable function using the results of the search. Program guide server 25 may, for example, identify episodes of programs that are new to a user (step 2380), or provide viewing recommendations in the form of, for example, reminders or recommendations for non-program items (e.g., software, Internet links, etc.) (step 2390).

The foregoing is merely illustrative of the principles of this invention and various modifications can be made by those skilled in the art without departing from the scope and spirit of the invention.

What is claimed is:

1. A method for use in a client-server interactive program guide system for scheduling reminders according to user defined expressions and providing a customized viewing experience to a user based on programs having scheduled reminders, comprising:
    providing a user with an opportunity to define an expression with an interactive program guide client implemented on user equipment without requiring the user to navigate the Internet;
    storing the expression on a program guide server;
    processing the expression with the program guide server to find programs that satisfy the expression;
    scheduling with the program guide server reminders for programs that satisfy the expression;
    determining at least one program criteria associated with the programs that satisfy the expression;
    determining a set of programs for which reminders have not yet been scheduled; and
    applying the at least one associated program criteria to the set of programs for which reminders have not yet been scheduled to generate at least one personal viewing recommendation.

2. The method defined in claim 1 wherein scheduling with the program guide server reminders for programs that satisfy the expression comprises providing at least one message from the program guide server to the program guide client before each of the programs that satisfy the expression begin.

3. The method defined in claim 1 wherein scheduling with the program guide server reminders for programs that satisfy the expression comprises providing program identifiers for each of the programs that satisfy the expression from the program guide server to the program guide client, wherein the program identifiers are used by the program guide client to generate reminders prior to the start of the programs.

4. A method for use in a client-server interactive program guide system for scheduling programs for recording according to user defined expressions and providing a customized viewing experience to a user based on the scheduled programs, comprising:
    providing a user with an opportunity to define an expression with an interactive program guide client implemented on user equipment without requiring the user to navigate the Internet;
    storing the expression on a program guide server;
    processing the expression with the program guide server to find programs that satisfy the expression;
    scheduling with the program guide server the programs that satisfy the expression for recording;

determining at least one program criteria associated with the programs that satisfy the expression;

determining a set of programs not yet scheduled for recording; and applying the at least one associated program criteria to the set of programs not yet scheduled for recording to generate at least one personal viewing recommendation.

5. The method defined in claim 4 wherein scheduling with the program guide server the programs that satisfy the expression for recording comprises scheduling the recording of the programs that satisfy the expression at the user equipment.

6. The method defined in claim 4 wherein scheduling with the program guide server the programs that satisfy the expression for recording comprises scheduling the recording of the programs that satisfy the at the program guide server.

7. A client-server interactive program guide system for scheduling reminders according to user defined expressions and providing a customized viewing experience to a user based on programs having scheduled reminders, comprising:

user equipment on which an interactive program guide client is implemented, wherein the program guide client is programmed to provide a user with an opportunity to define an expression without requiring the user to navigate the Internet;

a communications path over which the expression is provided by the interactive program guide client to a program guide server, wherein the program guide server is programmed to find programs that satisfy the expression, to schedule reminders for programs that satisfy the expression, to determine at least one program criteria associated with the programs that satisfy the expression, to determine a set of programs for which reminders have not yet been scheduled, and to apply the at least one program criteria to the set of programs for which reminders have not yet been scheduled to generate at least one personal viewing recommendation.

8. The system defined in claim 7 wherein scheduling with the program guide server reminders for programs that satisfy the expression comprises providing at least one message from the program guide server to the program guide client before each of the programs that satisfy the expression begin.

9. The system defined in claim 7 wherein the program guide server is further programmed to provide program identifiers for each of the programs that satisfy the expression to the interactive television program guide client over the communications path, wherein the program identifiers are used by the interactive program guide client to generate the reminders prior to the start of the programs.

10. A client-server interactive program guide system for scheduling programs for recording according to user defined expressions and providing a customized viewing experience to a user based on the scheduled programs, comprising:

user equipment on which an interactive program guide client is implemented, wherein the interactive program guide client is programmed to provide a user with an opportunity to define an expression without requiring the user to navigate the Internet;

a communications path over which the expression is provided by the interactive program guide client to a program guide server, wherein the program guide server is programmed to find programs that satisfy the expression, and to schedule the programs that satisfy the expression for recording, to determine at least one program criteria associated with the programs that satisfy the expression, to determine a set of programs not yet scheduled for recording, and to apply the at least one program criteria to the set of programs not yet scheduled for recording to generate at least one personal viewing recommendation.

11. The system defined in claim 10 wherein:

the user television equipment comprises a storage device; and the program guide server is further programmed to schedule the programs that satisfy the expression for recording by the storage device.

12. The system defined in claim 10 wherein the program guide server comprises a storage device on which the programs that satisfy the expression are stored.

13. A method for use in an interactive program guide system for providing a customized viewing experience to a user, comprising:

generating a viewing history database comprising program listings and associated program criteria;

determining at least one of the associated program criteria from the viewing history database that meets a user preference profile;

determining from a program listing database a set of programs not yet watched;

applying the at least one of the associated program criteria to the set of programs not yet watched to generate at least one personal viewing recommendation; and providing the personal viewing recommendation to a user.

14. The method defined in claim 13 wherein generating a viewing history database comprises storing the program listings and the associated program criteria for at least one of:

programs that the user has watched;
programs for which the user has scheduled reminders;
programs for which the user has scheduled for recording;
programs for which the user has searched; and
programs for which the user has ordered.

15. The method defined in claim 13 wherein the associated program criteria comprises at least one of program categories, ratings, casting, and languages.

16. The method defined in claim 13 wherein the at least one of the associated program criteria is the same as at least one criteria defined in the user preference profile.

17. An interactive program guide system for providing a customized viewing experience to a user, comprising:

user equipment on which an interactive program guide client is implemented, wherein the interactive program guide client is operative to provide the user with an opportunity to create a user preference profile;

a communications path over which the user preference profile is provided by the interactive program guide client to a program guide server, wherein the program guide server comprises:

a first database comprising program listings and associated program criteria based on the user's viewing history at the interactive program guide client, a second database comprising program listings available from the program guide server, and processing circuitry operative (1) to determine at least one of the associated program criteria from the first database that meets the user preference profile, (2) to determine from the second database a set of programs not yet watched by the user at the interactive program guide client, (3) to apply the at least one of the associated program criteria to the set of programs not yet watched to generate at least one personal viewing recommendation, and (4) to provide the personal viewing recommendation to the user at the interactive program guide client over the communications path.

18. The system defined in claim 17 wherein the first database comprising program listings and associated program criteria is based on at least one of:
   programs that the user has watched;
   programs for which the user has scheduled reminders;
   programs for which the user has scheduled for recording;
   programs for which the user has searched; and
   programs for which the user has ordered.

19. The system defined in claim 17 wherein the associated program criteria comprises at least one of program categories, ratings, casting, and languages.

20. The system defined in claim 17 wherein at least one of the associated program criteria is the same as at least one criteria defined in the user preference profile.

21. The method of claim 1 wherein scheduling reminders for programs that satisfy the expression further comprises, for each of the programs that satisfy the expression, storing a program listing and an associated program criteria in a viewing history database.

22. The method of claim 1 further comprising at least one of:
   providing the user with an opportunity to tune to the personal viewing recommendation,
   scheduling with the program guide server a reminder for the personal viewing recommendation;
   scheduling with the program guide server the personal viewing recommendation for recording; and
   providing the user with an opportunity to order the personal viewing recommendation.

23. The method of claim 4 wherein scheduling programs that satisfy the expression for recording further comprises, for each of the programs that satisfy the expression, storing a program listing and an associated program criteria in a viewing history database.

24. The method of claim 4 further comprising at least one of:
   providing the user with an opportunity to tune to the personal viewing recommendation,
   scheduling with the program guide server a reminder for the personal viewing recommendation;
   scheduling with the program guide server the personal viewing recommendation for recording; and
   providing the user with an opportunity to order the personal viewing recommendation.

* * * * *

UNITED STATES PATENT AND TRADEMARK OFFICE
CERTIFICATE OF CORRECTION

PATENT NO.       : 7,065,709 B2
APPLICATION NO.  : 10/298274
DATED            : June 20, 2006
INVENTOR(S)      : Michael D. Ellis et al.

It is certified that error appears in the above-identified patent and that said Letters Patent is hereby corrected as shown below:

<u>Title Page 2, Item (56), in the References Cited,</u>
Under U.S. Patent Documents, "5,422,389 A 6/1995 Trepka et al." should be
--5,422,389 A 8/1995 Blahut et al.--.

<u>Title Page 2, Item (56), in the References Cited,</u>
Under Foreign Patent Documents, "WO 97/17064" should be --WO 98/17064--.

<u>Title Page 2, Item (56), in the References Cited,</u>
Under Other Publications, before "Rewind" should be inserted --"--.
Under Other Publications, after "devices," should be inserted --"--.

<u>Column 1,</u>
Line 7, "applications" should be --application--.
Line 27, after "program" should be inserted --guides,--.
Line 42, "," after "systems" should be deleted.

<u>Column 5,</u>
Line 11, after "1999" should be inserted --(Attorney Docket No. UV-106)--.

<u>Column 10,</u>
Line 62, after "1999" should be inserted --(Attorney Docket No. UV-114)--.

<u>Column 17,</u>
Line 9, after "1999" should be inserted --(Attorney Docket No, UV-56)--.

<u>Column 18,</u>
Line 4, after "1999" should be inserted --(Attorney Docket No. UV-84)--.
Line 32, after "1999" should be inserted --(Attorney Docket No. UV-84)--.

<u>Column 19,</u>
Line 17, after "1999" should be inserted --(Attorney Docket No. UV-114)--.
Line 39, after "1998" should he inserted --(Attorney Docket No. UV-58)--.
Line 52, after "1998" should be inserted --(Attorney Docket No. UV-57)--.

<u>Column 20,</u>
Line 9, after "1998" should be inserted --(Attorney Docket No. UV-42)--.
Line 60, after "1999" should be inserted --(Attorney Docket No. UV-114)--.

<u>Column 22,</u>
Line 21, "2110. Program" should be --2110, program--.

UNITED STATES PATENT AND TRADEMARK OFFICE
CERTIFICATE OF CORRECTION

PATENT NO. : 7,065,709 B2
APPLICATION NO. : 10/298274
DATED : June 20, 2006
INVENTOR(S) : Michael D. Ellis et al.

It is certified that error appears in the above-identified patent and that said Letters Patent is hereby corrected as shown below:

Column 25,
Line 17, after "satisfy the" should be inserted --expression--.

Signed and Sealed this

Nineteenth Day of August, 2008

JON W. DUDAS
*Director of the United States Patent and Trademark Office*